US012718060B2

(12) United States Patent
B'far et al.

(10) Patent No.: US 12,718,060 B2
(45) Date of Patent: Aug. 25, 2026

(54) HUMAN-UNDERSTANDABLE INSIGHTS FOR NEURAL NETWORK PREDICTIONS

(71) Applicant: Oracle International Corporation, Redwood Shores, CA (US)

(72) Inventors: Reza B'far, Irvine, CA (US); Do Joon Ra, Tustin, CA (US); Yasin Cengiz, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1013 days.

(21) Appl. No.: 17/689,191

(22) Filed: Mar. 8, 2022

(65) Prior Publication Data

US 2023/0289559 A1 Sep. 14, 2023

(51) Int. Cl.
*G06N 3/045* (2023.01)
*G06N 5/01* (2023.01)

(52) U.S. Cl.
CPC .............. *G06N 3/045* (2023.01); *G06N 5/01* (2023.01)

(58) Field of Classification Search
CPC ............ G06N 3/045; G06N 5/01; G06N 3/09; G06Q 20/4016; G06Q 40/02
See application file for complete search history.

(56) References Cited

U.S. PATENT DOCUMENTS 8,458,069 B2 6/2013 Adjaoute
10,726,334 B1 * 7/2020 Elnahrawy ............ G06N 3/045
10,977,654 B2 4/2021 Kumar et al.
2016/0162779 A1 * 6/2016 Marcus ................ G06N 20/10 706/12
2017/0032026 A1 * 2/2017 Parker .................. G06F 16/156
2020/0279140 A1 * 9/2020 Pai ..................... G06F 11/3447
(Continued)

FOREIGN PATENT DOCUMENTS

CN 112766415 A 5/2021
CN 112907254 A 6/2021
KR 10-2021-0092482 A 7/2021

OTHER PUBLICATIONS

Mouton, Coenraad, and Marelie H. Davel. "Exploring layerwise decision making in DNNs." Southern African Conference for Artificial Intelligence Research. Cham: Springer International Publishing, 2021. (Year: 2021).*

(Continued)

*Primary Examiner* — Kevin W Figueroa
*Assistant Examiner* — Victor Adelard Nault
(74) *Attorney, Agent, or Firm* — Invoke

(57) ABSTRACT

Techniques for mapping human-understandable attributes to a neural network are disclosed. A system generates human-understandable explanations for decisions or predictions of a neural network by mapping human-understandable attributes to the trained neural network. The system may map a human-understandable attribute to a particular label, indicating a correlation between the particular human-understandable attribute and the particular label. In addition, or in the alternative, the system may map the human-understandable attribute to a particular layer of the neural network, such as a particular hidden layer, indicating a correlation between the human-understandable attribute and the particular layer.

18 Claims, 16 Drawing Sheets

(56) References Cited

U.S. PATENT DOCUMENTS

| | | | | |
|---|---|---|---|---|
| 2021/0019753 | A1* | 1/2021 | Zhao | G06N 5/045 |
| 2023/0367995 | A1* | 11/2023 | Mukhopadhyay | G06N 3/09 |

OTHER PUBLICATIONS

Aggarwal, Aniya, et al. "Black box fairness testing of machine learning models." Proceedings of the 2019 27th ACM joint meeting on european software engineering conference and symposium on the foundations of software engineering. 2019. (Year: 2019).*

Ho, Daniel. "NBDT: Neural-backed decision trees." Master's thesis, EECS Dept., Univ. California, Berkeley, CA, USA, May 2020 (2020). (Year: 2020).*

Zilke, Jan Ruben, Eneldo Loza Mencía, and Frederik Janssen. "Deepred-rule extraction from deep neural networks." Discovery Science: 19th International Conference, DS 2016, Bari, Italy, Oct. 19-21, 2016, Proceedings 19. Springer International Publishing, 2016. (Year: 2016).*

Panda, Priyadarshini, Abhronil Sengupta, and Kaushik Roy. "Conditional deep learning for energy-efficient and enhanced pattern recognition." 2016 design, automation & test in europe conference & exhibition (DATE). IEEE, 2016. (Year: 2016).*

Han, Yizeng, et al. "Dynamic Neural Networks: A Survey." arXiv preprint arXiv:2102.04906 (2021). (Year: 2021).*

"Explaining a fraud detection model with Cloud AI Platform," Retrieved at https://codelabs.developers.google.com/codelabs/fraud-detection-ai-explanations#/0, Jun. 26, 2021, p. 1.

"Explaining a fraud detection model with Cloud AI Platform," Retrieved at https://codelabs.developers.google.com/codelabs/fraud-detection-ai-explanations#5, Jun. 26, 2021, p. 1-4.

"How We Used Data Analysis to Detect Fraudulent Transaction," Retrieved at https://agilie.com/en/blog/how-we-used-data-analysis-to-detect-fraudulent-transaction, Retrieved on Mar. 2022, pp. 1-8.

"Machine learning for fraud detection," Retrieved at https://ravelin.zendesk.com/hc/en-us/articles/213848605-Fraud-Scores-, Oct. 10, 2019, pp. 2.

"Machine learning for fraud detection," Retrieved at https://www.ravelin.com/insights/machine-learning-for-fraud detection, Retrieved on Mar. 2022, pp. 1-12.

Psychoula I. et al., "Explainable Machine Learning for Fraud Detection," To be published in IEEE Computer Special Issue on Explainable AI and Machine Learning, May 2021, pp. 1-12.

Wu T-Y. et al., "Locally Interpretable One-Class Anomaly Detection for Credit Card Fraud Detection," National Taiwain University, Oct. 2021, pp. 1-6.

* cited by examiner

DISPLAY 612
INPUT DEVICE 614
CURSOR CONTROL 616
MAIN MEMORY 606
ROM 608
STORAGE DEVICE 610
BUS 602
PROCESSOR 604
COMMUNICATION INTERFACE 618
600
NETWORK LINK 620
628
INTERNET
ISP
626
SERVER 630
LOCAL NETWORK 622
HOST 624

HUMAN-UNDERSTANDABLE INSIGHTS FOR NEURAL NETWORK PREDICTIONS

TECHNICAL FIELD

The present disclosure relates to generating insights for the operations of a trained neural network. In particular, the present disclosure relates to mapping human-understandable attributes to neural network predictions.

BACKGROUND

Artificial intelligence is increasingly being used to process larger quantities of data more efficiently than is possible by humans. For example, a human auditor reviewing years of financial documents to identify fraudulent transactions may take months or years to complete the task. A neural network trained to identify fraudulent transactions in electronic documents could complete the task in hours or minutes. However, artificial intelligence systems such as machine learning models and neural networks suffer from a lack of explainability. A neural network that receives data associated with a transaction as input applies a complex series of mathematical formulae to the data to generate a label of "fraudulent" or "not fraudulent." Similarly, neural networks trained to identify particular subjects in images, letters, numbers, words, and phrases or to recognize speech, are trained by adjusting values in mathematical algorithms to generate outputs based on probability. Even if the probability of a neural network being correct is very high, such as 99% or 100%, a customer may not trust the results generated by the neural network if the customer does not understand what factors the neural network is considering when making a particular prediction.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
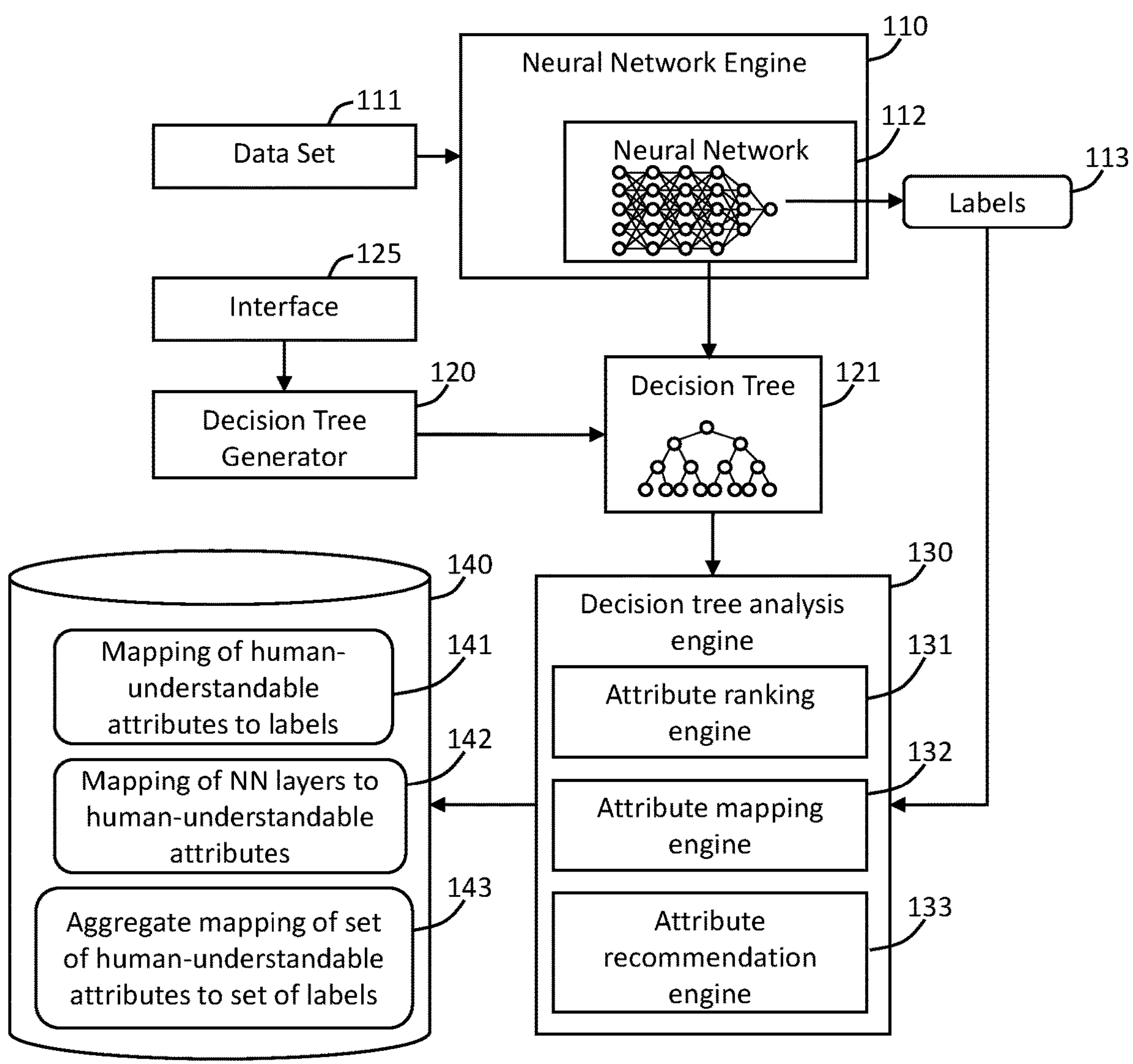
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING HUMAN-UNDERSTANDABLE INSIGHTS FOR NEURAL NETWORK PREDICTIONS
4. DECISION TREE OPTIMIZATION
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

A system may train a neural network using a historical data set. The historical data set may include a multitude of data points, each data point being associated with a label(s) and tens, hundreds, or even thousands of attributes. Once trained, the neural network may then determine a label for a target data point with a corresponding set of attributes. However, the trained neural network typically functions as a Blackbox. Specifically, while the trained neural network outputs the label for the target data point, the trained neural network does not typically output information regarding which of the attributes of the target data point contributed to the trained neural network's determination of the label.

One or more embodiments generate insight into the operation of a trained neural network. The system may, for example, identify (a) the human-understandable attributes that contributed to a trained neural network's determination of a label(s) for a target data point and/or (b) the human-understandable attributes that did not contribute to the trained neural network's determination of the label(s) for the target data point.

One or more embodiments generate insight specific to any of the hidden layers defined by the trained neural network. In an example, the system initially trains a neural network using a historical data set. Training the neural network includes generating n hidden layers for the neural network and the functions/weights applied to each hidden layer to compute the next hidden layer. The training may further include determining the functions/weights to be applied to the final, n-th hidden layer that compute the final label(s) or prediction(s) for a data point. In order to generate insight specific to a particular layer such as, the n-minus-$5^{th}$ layer, the system generates a modified version of the previously trained neural network. Specifically, the system modifies the functions/weights applied to the n-minus-$5^{th}$ layer from (a) functions/weights that compute the n-minus-$4^{th}$ layer to (b) functions/weights that directly compute the final label(s) or prediction(s) for a data point. This modified version (hereinafter "modified neural network") of the previously trained neural network does not use the hidden layers ranging from the n-minus-$4^{th}$ layer to the nth layer since the n-minus-$5^{th}$ layer is used to directly compute the final label(s) or prediction(s). The modified neural network is then applied to each of a set of data points to compute the final label(s) for the set of data points. A subset of these data points that result in a particular label are identified. The human-understandable attributes shared across at least a threshold number of the subset of data points, now associated with the particular label, are (a) identified as contributing factors for the determination of the particular label by the modified neural network and (b) identified as attributes determined by the n-minus-$5^{th}$ layer to be indicative of the particular label. The human-understandable attributes that are not shared across at least a threshold number of the subset of data points, associated with the particular label, are identified as non-contributing factors for the determination of the particular label by the modified neural network. Alternatively, or in addition, the system may compute a confidence score corresponding a level of confidence of the attribute being considered by the n-minus-$5^{th}$ layer as a contributing factor of a particular label. The confidence score may be based on a number of subset of data points, associated with the particular label, sharing that attribute. Accordingly, the system generates human-understandable insight into the operations of the n-minus-$5^{th}$ layer of the previously trained neural network using the modified neural network.

One or more embodiments generate insight into a relationship between particular hidden layers of the trained neural network and particular human-understandable attributes. The system may identify different subsets of data points associated with a particular label at different hidden layers of the trained neural network. The system identifies different distributions of a same set of human-understandable attributes across the different subsets of data points. For example, the trained neural network may determine that a subset of data points associated with a particular label at the n-minus-$5^{th}$ layer has a high frequency of occurrence of one human-understandable attribute and an average frequency of occurrence of another human-understandable attribute. The trained neural network may determine that another subset of data points associated with the same particular label at the n-minus-$4^{th}$ layer has a high frequency of occurrence of the one human-understandable attribute and a high frequency of occurrence of the other human-understandable attribute. The system may map the one human-understandable attribute to the n-minus-$5^{th}$ layer and the other human-understandable attribute to the n-minus $4^{th}$ layer.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a neural network engine 110, a decision tree generator 120, a decision tree analysis engine 130, and a data repository 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

The neural network engine 110 trains a neural network 112 using a data set (not shown) made up of (1) historical data points, and (2) labels associated with the historical data points. The neural network engine 110 divides the data set of historical data into at least a training set and a test set. The training set is passed through the neural network 112, the neural network engine 110 adjusts variables (e.g., weights and offsets) for the neurons in the neural network 112 to train the neural network 112 to correctly predict labels 113 for the historical data points. The neural network 112 illustrated in FIG. 1 represents a trained neural network. The neurons in the neural network 112 comprise functions that take in a set of input values from each neuron in a previous layer of the neural network 112, apply weights to the input values, apply one or more offset values to one or more weighted input values, and apply an activation function to generate a value within a predefined range based on the weighted, offset, input values. The values of the layers of the neural network are mathematical formulae that are not human understandable. In other words, a human cannot determine from the mathematical formulae of any particular layer of the neural network 112 the particular human-understandable attributes that may be associated with a particular layer. For example, in an example embodiment in which the neural network is trained to identify fraudulent transactions in financial data, a human cannot determine from the values of any particular layer in the neural network 112 whether the values in the layer are associated with a source of the transaction, a recipient of the transaction, an amount of the transaction, a frequency of the transaction, or any other human-understandable attribute a human may associate with a fraudulent transaction.

The data set 111 represents data points having the same attributes as the historical data set, but having varying attribute values. For example, in one embodiment, the neural network is provided historical data associated with financial transactions. The neural network is trained to identify a particular financial transaction as being fraudulent or not. The data set 111 includes financial transactions 111 having attributes (such as sender, recipient, amount, product type, date, frequency of transaction, etc.) corresponding to the attributes of the historical data set. The neural network 112 generates a label 113 "fraudulent" or "not fraudulent" for the data points in the data set 111.

A decision tree generator 120 generates a decision tree 121 comprising a plurality of nodes. Each node of the decision tree corresponds to a human-understandable attribute. The decision tree is applied to the data set 111 to generate a set of human-understandable attributes associated with the data set 111. According to one or more embodiments, the system 100 applies the decision tree 121 to sub-sets of data associated with a particular label 113. For example, in an embodiment in which the label indicates whether a data point associated with a set of input data is an image of a particular object (e.g., whether the image is a face), the decision tree is applied to the sub-set of data points, in the data set 111, for which the neural network 112 generated an output value indicating the data points depicted a face.

Continuing the example embodiment in which the neural network 112 is trained to identify a face in an image, the decision tree 121 includes human-understandable features associated with a face. For example, one node includes a decision: "Is the object oval-shaped?" Another node includes a decision: "Does the object have two eye-shaped parts?" Another node includes a decision: "Does the object include two ear-shaped protrusions on the sides of an oval?"

Another node includes a decision: "Is a ratio from a top of the oval to eye-shaped parts approximately the same as a ratio from the eye-shaped parts to the bottom of the oval?"

According to another example embodiment, the neural network 112 may be trained to identify whether an image includes a particular character or set of characters, such as alphanumeric characters. Accordingly, the neural network 112 may be trained to receive values of thousands of pixels as an input and generate a label of one of 62 alpha-numeric characters as an output. The decision tree 121 may include human-understandable features, such as a node: "Does the image have a vertical line?" Another node may include a decision: "Does a vertical line have a horizontal line crossing it?" Another node may include a decision: "Does the image include a loop shape?" The decision tree 121 may receive the subset of data points that the neural network 112 identified as a "3," and determine the human-understandable characteristics that are represented in the subset of data points. Similarly, the decision tree 121 may receive a subset of data points the neural network 112 identified as a "B" and determine the human-understandable characteristics that are represented in the sub-set of data points.

According to one embodiment, the human-understandable attributes are provided by a user via the interface 125. In addition, or in the alternative, the human-understandable attributes may be obtained from the data repository 140. For example, a set of human-understandable attributes associated with a particular set of labels may be pre-stored.

In one or more embodiments, interface 125 refers to hardware and/or software configured to facilitate communications between a user and the decision tree generator 120. The interface 125 may additionally be connected to the neural network engine 110 to allow for supervised or semi-supervised training of the neural network 112. For example, during training of the neural network 112, a user may indicate that a particular label 113 generated by the neural network 112 is incorrect. The neural network engine 110 retrains the neural network 112 based on the user feedback. Interface 125 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 125 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 125 is specified in one or more other languages, such as Java, C, or C++.

The decision tree analysis engine 130 analyzes the values output by the decision tree 121. The decision tree analysis engine 130 includes an attribute ranking engine 131. The attribute ranking engine 131 generates a confidence score associated with particular human-understandable attributes based on the results of applying the decision tree to data sets associated with the neural network 112. For example, if a given sub-set of data points associated with a particular label 113 includes 5 data points that are characterized by one attribute associated with one node of the decision tree and 10 data points that are characterized by another attribute associated with another node of the decision tree, the ranking engine 131 generates a higher confidence score associated with the attribute associated with the greater number of data points than the attribute associated with the lesser number of data points. The confidence score may represent a correlation between a particular layer of the neural network 112 and attributes associated with the particular layer. For example, a human may not be capable of determining any correlation between a layer of the neural network 112 and any human-understandable attribute based on values of the mathematical formulae that make up the neurons of the neural network layer. However, the distribution of human-understandable attributes indicated by the decision tree 121 provides a correlation between the neural network layer and at least some human-understandable attributes. The attribute ranking engine 131 ranks the attributes associated with a respective layer of the neural network 112 based on the confidence scores of the human-understandable attributes.

An attribute mapping engine 132 generates: (a) a mapping of human-understandable attributes to labels 141, (b) a mapping of neural network layers to human-understandable attributes 142, and (c) an aggregate mapping of sets of human-understandable attributes to particular sets of labels 143. The attribute mapping engine may generate the mappings based on the confidence scores of the human-understandable attributes in the decision tree.

For example, the attribute mapping engine 132 may determine that a first set of human-understandable attributes is most commonly associated with a first label. The attribute mapping engine 132 may determine that a second set of human-recognizable attributes is most commonly associated with a second label. In an example embodiment, the neural network may be trained to identify categories of transactions as "fraudulent," "possibly fraudulent," "mistake," and "not likely fraudulent/no mistake." A human-understandable attribute "large amount/one-time transaction to recipient" may be most commonly associated with the label "fraudulent." The human-understandable attribute "wrong account number" may be the most common human-understandable attribute among the financial transactions labeled "mistake." Accordingly, the attribute mapping engine 132 may map to a particular label the human-understandable attributes having the highest correlation with the particular label.

According to another example, a set of human-understandable attributes may have confidence scores of 1, 2, and 3 respectively at a first layer of a neural network. The same set of human-understandable attributes may have confidence scores of 3, 2, and 1 at another layer of the neural network. The difference in confidence scores may be the result of different distributions of the human-understandable attributes in the particular subsets of data associated with a particular label at the different layers of the neural network. The attribute mapping engine 132 may map the first layer to the third human-understandable attribute and the second layer to the first human-understandable attribute. While a set of three human-understandable attributes and two neural network layers is provided for ease of explanation, embodiments encompass any number of human-understandable attributes associated with any number of neural network layers. For example, a neural network may be trained to label financial transactions as fraudulent or not fraudulent. A decision tree may be generated to identify ten different human-understandable attributes in data points (e.g., financial transactions) that the neural network labels fraudulent. Applying the decision tree to the output layer of the neural network may identify small, repeat transactions to one account as being the primary human-understandable attribute common to the majority of transactions labeled as fraudulent. However, applying an output-type layer to an intermediate hidden layer to generate a fraudulent/not fraudulent label from the intermediate hidden layer may indicate that half of the transactions that would be labeled as fraudulent are small, repeat transactions and forty percent are transactions to unknown recipients. Accordingly, the system may map the intermediate hidden layer to the human-understandable attribute "unknown recipient."

An attribute recommendation engine 133 recommends human-understandable attributes to include in a decision tree 121. For example, a user may generate a decision tree based on human-understandable attributes associated with a fraudulent transaction. However, when the decision tree is applied to the data points identified as fraudulent, the number of data points associated with the human-understandable attributes may be below a threshold, indicating the provided human-understandable attributes may not correspond to the particular data set. For example, in an embodiment in which the neural network is trained to identify fraudulent transactions, the human-understandable attributes may include "ten or more transactions of small amounts to a same unknown recipient," "duplicate transactions," and "transaction to relative of sender." However, the data set may primarily include transactions, identified as fraudulent, of large amounts occurring one time to unknown recipients. Since the decision tree does not include the human-understandable attribute that is common to the majority of the fraudulent transactions, the confidence scores of the human-understandable attributes in the decision tree may be low. Based on determining that a set of human-understandable attributes of a decision tree do not meet a threshold confidence level, the attribute recommendation engine 133 may refer to a data source associated with the type of labels for which the neural network is trained to identify and recommend alternative human-understandable attributes for the decision tree. For example, the attribute recommendation engine 133 may consult a glossary associated with fraudulent transactions to identify other human-understandable terms that are common among fraudulent transactions.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the decision tree analysis engine 130. Alternatively, or additionally, a data repository 140 may be implemented or executed on a computing system separate from the decision tree analysis engine 130. A data repository 140 may be communicatively coupled to the decision tree analysis engine 130 via a direct connection or via a network.

Information describing the mappings of attributes to labels or layers of a neural network may be implemented across any of components within the system 100. However, this information is illustrated within the data repository 140 for purposes of clarity and explanation.

In one or more embodiments, a decision tree analysis engine 130 refers to hardware and/or software configured to perform operations described herein for mapping human-understandable attributes to layers of a neural network. Examples of operations for mapping human-understandable attributes to layers of a neural network are described below with reference to FIG. 2.

In an embodiment, a decision tree analysis engine 130 and a decision tree generator 120 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating Human-Understandable Insights for Neural Network Predictions

Figure 2:
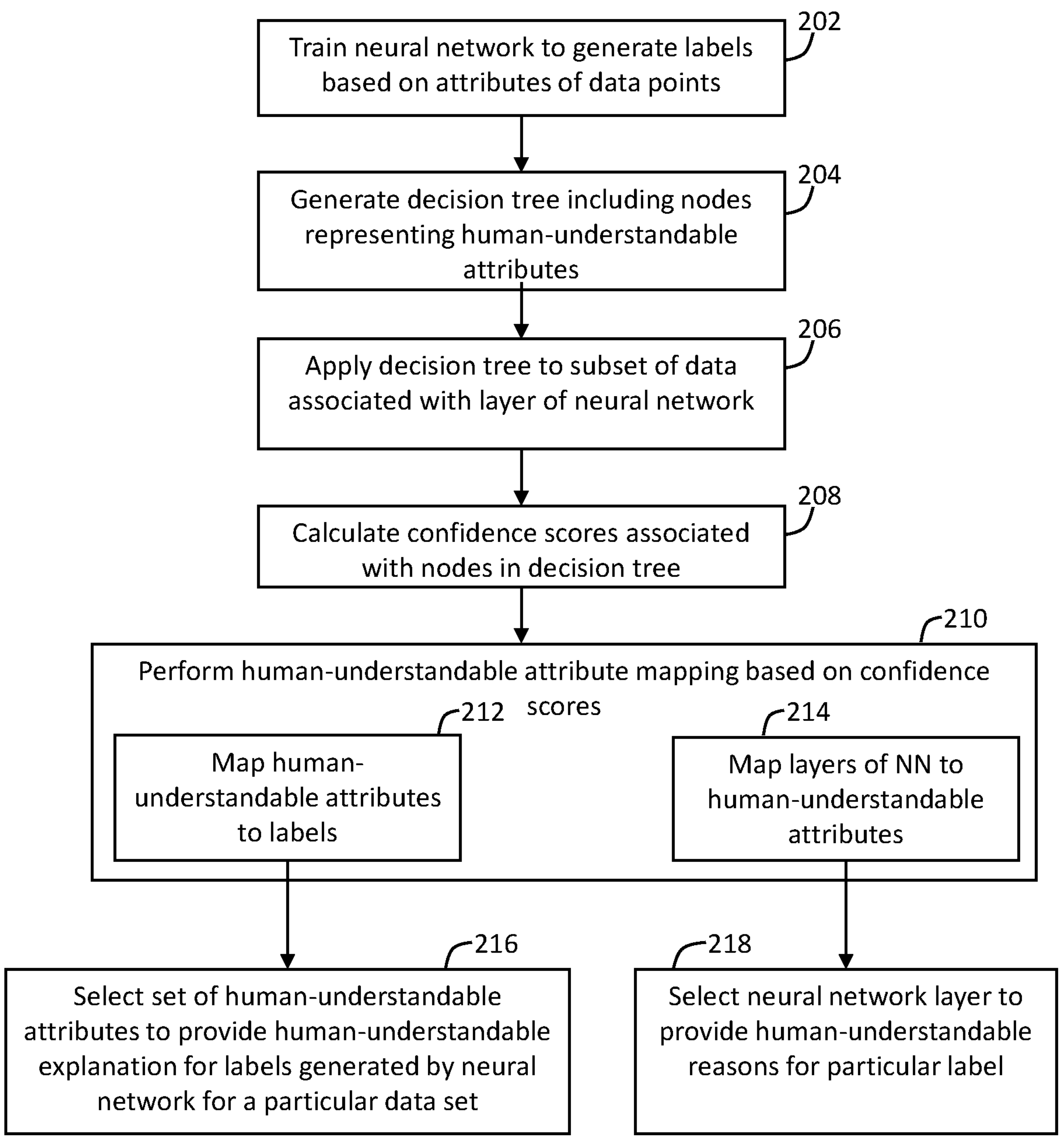
FIG. 2 illustrates an example set of operations for mapping human-understandable attributes to one or more layers of a trained neural network in accordance with one or more embodiments.

FIG. 2 illustrates an example set of operations for mapping human-understandable attributes to neural network labels in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system trains a neural network to generate labels based on attributes of data points in a data set (Operation 202). Training a neural network includes: (a) obtaining a training data set, (b) iteratively applying the training data set to a neural network to generate labels for data points of the training data set, and (c) adjusting weights and offsets associated with the formulae that make up the neurons of the neural network based on a loss function that compares values associated with the generated labels to values associated with test labels. The neurons of the neural network include activation functions to specify bounds for a value output by the neurons. The activation functions may include differentiable nonlinear activation functions, such as rectified linear activation (ReLU) functions, logistic-type functions, or hyperbolic tangent-type functions. Each neuron receives the values of each neuron of the previous layer, applies a weight to each value of the previous layer, and applies one or more offsets to the combined values of the previous layer. The activation function constrains a range of possible output values from a neuron. A sigmoid-type activation function converts the neuron value to a value between 0 and 1. A ReLU-type activation function converts the neuron value to 0, if the neuron value is negative, and to the output value if the neuron value is positive. The ReLU-type activation function may also be scaled to output a value between 0 and 1. For example, after applying weights and an offset value to the values from the previous layer for one neuron, the system may scale the neuron value to a value between −1 and +1. The system may then apply the ReLU-type activation function to generate a neuron output value between 0 and 1. The system trains the neural network using the training data set, a test data set, and a verification data set until the labels generated by the trained neural network are within a specified level of accuracy, such as 98% accuracy.

The system generates a decision tree made up of nodes, where each node corresponds to a human-understandable attribute (Operation 204). According to one example, a user may specify a set of attributes for which the user would like to know the frequency of the attributes in the data set. For example, in an example embodiment in which the neural network is trained to identify fraudulent transactions, an input may be a vector having different values representing attributes of a financial transaction (e.g., an input data point), such as "date," "sender," "recipient," "amount," "record type," "approval," etc. The attributes are converted to numerical values to generate the input vector to the neural network. The neural network generates sets of matrices at each hidden layer based on the input vector and transformations of values of the input vector by formulae at each neuron of the neural network. The matrices bear no human-understandable relationship to the attributes of the input data point. A user may specify a set of human-understandable attributes that will make up a decision tree, such as: "first transaction to a particular recipient," "transaction amount above threshold," "one transaction among set of identical transactions of small amounts to same recipient," and "transaction not properly authorized." The human-understandable attributes that define the decision tree are not coextensive with the attributes of a data point that define an input vector to the trained neural network. In the example above, in which the neural network is trained to identify fraudulent transactions, the example human-understandable attributes are different from the example attributes of the data points that define the input vector.

According to another embodiment, the system may generate, without receiving user input to specify particular human-understandable attributes, a set of human-understandable attributes associated with a particular neural network. For example, the system may determine that the neural network is trained to identify fraudulent transactions. The system may refer to a database, dictionary, or other data source to identify the most common types of fraudulent transactions. The system may generate a decision tree based on the most common types of fraudulent transactions.

According to another example embodiment, the system may determine that the neural network is trained to identify faces in images. The system may refer to a database, dictionary, or other data source to identify features associated with faces, such as "oval-shaped," "nose shape at center," "eye shapes on front," "ear shapes on sides," "eye shapes half-way down oval shape," "skin tone," etc. The system may generate a decision tree based on the most common types of characteristics used to identify faces.

According to yet another example embodiment, the system may generate an initial set of human-understandable attributes, without obtaining human input. A human may then edit the initial set of human-understandable characteristics to generate a customized decision tree.

The system applies the decision tree to a subset of data points associated with a layer of the neural network to determine the frequency with which the human-understandable characteristics are present in data points of the subset (Operation 206). For example, an output layer generates a particular label for a subset of data points in a data set. According to an example embodiment, the subset of data points may include the data points labeled "fraudulent," and the subset may exclude the data points that are not labeled "fraudulent." The data set may include the training data set. For example, after training the neural network using the training, testing, and validation data sets, the system may re-run one or more of the training, testing, and validation data sets while applying a decision tree to one or more layers of the neural network to generate sets of human-understandable attributes associated with labels generated by the neural network at the respective layers. For example, if the training data set includes labeled financial transactions, the system may generate the subset of data by applying the neural network to the training data set made up of financial transactions. Alternatively, the system may generate the subset of data by applying the neural network to another data set made up of financial transactions. The system may apply the decision tree to the output layer of the neural network that includes an input layer, a set of hidden layers, and the output layer. The system may also apply the decision tree to any hidden layer of the neural network.

The result of applying the decision tree to the subset of data points is a set of values that, for each node of the decision tree, represents a number of data points among the subset of data points that in which the human-understandable attribute associated with the node is present. For example, if a subset of transactions labeled "fraudulent" includes ten data points, and if an initial node of a data tree is "known recipient," then the node may filter three transactions as "Yes" (i.e., the data points have a known recipient) and seven transactions as "No" (i.e., the data points do not have a known recipient). A subsequent node (e.g., a child node) may include another human-understandable attribute that may further classify the data points of the subset of data points.

Based on the number of times a particular human-understandable attribute is present in the subset of data points associated with a layer of the neural network, the system generates a confidence score for the node associated with the particular human-understandable attribute (Operation 208). For example, a subset of data points associated with a particular label and a particular layer of the neural network may include 100 data points (from among 1000 total data points in a data set). Applying the decision tree to the subset of 100 data points may return the following results: human-understandable attribute (HUA)1: 25 data points; HUA2: 22 data points; HUA3: 0 data points; HUA4: 5 data points; HUA5: 5 data points; HUA6: 4 data points. The system generates confidence scores for the respective nodes associated with the respective human-understandable attributes based on the results. According to one embodiment, the confidence score represents a correlation between the number of data points associated with a particular label of a particular layer of the neural network that include the human-understandable attribute. For example, the confidence score may be a number between 1 and 10 representing the how much a particular human-understandable attribute is represented in a subset of data points associated with a particular label at a particular layer of the neural network. Continuing the above example, the system may generate the following confidence scores for the respective human-understandable attributes: HUA1: 2.5, HRA2: 2.2, HUA3: 0, HUA4: 0.5, HUA5: 0.5, HUA6: 0.4. According to one embodiment, the confidence score may represent an influence of a human-understandable attribute on a particular label at a particular layer of the neural network relative to other human-understandable attributes. For example, based on the above distribution of data points among the human-understandable attributes, the system may calculate the following confidence scores: HUA1: 4, HRA2: 3.6, HUA3: 0, HUA4: 0.8, HUA5: 0.8, HUA6: 0.7.

According to one or more embodiments, the system may apply the decision tree to different layers of the trained neural network to obtain different confidence scores for the respective layers. For example, applying the decision tree to a subset of data points associated with a particular label generated at the output layer of the neural network may result in a first set of confidence scores associated with the human-understandable attributes of the decision tree. Applying the decision tree to the particular label generated by applying an output-type layer to an intermediate hidden layer of the trained neural network may result in a second set of confidence scores, different from the first set of confidence scores, associated with the human-understandable attributes of the decision tree.

Based on the confidence scores associated with the human-understandable attributes, the system maps the human-understandable attributes of the decision tree to the neural network (Operation 210). According to one example embodiment, the system applies a decision tree to the output layer of the neural network to obtain confidence scores for human-understandable attributes associated with the entire neural network. The system may map a predefined set of human-understandable attributes to the neural network based on the confidence scores. For example, the system may map the three highest-value confidence scores to the neural network. Alternatively, or in addition, the system may map confidence scores exceeding a threshold score to the neural network. The system may refrain from mapping confidence scores to the neural network that do not meet the threshold.

According to one embodiment, the system maps human-understandable attributes to particular labels based on the confidence scores associated with the labels (Operation 212). The system may determine that a particular set of human-understandable attributes has the highest confidence scores associated with a particular label generated by the neural network. In the example embodiment in which the neural network is trained to identify fraudulent transactions, the system may identify two human-understandable attributes, "a high number of transactions of a low value" and "transaction to unknown recipient" as having the highest confidence scores. The system may map these two human-understandable attributes to the label "fraudulent." According to another example, the neural network may be trained to generate ten different labels associated with ten different images. The system may map different sets of human-understandable attributes to the different labels according to the presence of the human-understandable attributes in data points associated with the subsets of data associated with each of the separate labels. For example, in an example embodiment in which the neural network is trained to identify numbers in images, the system may map a human-understandable attribute "c-shape" to the label "3" based on a high confidence score associated with the human-understandable attribute "c-shape." The system may further map the human-understandable attribute "closed loop" to the number "6" based on a high confidence score associated with the human-understandable attribute "closed loop."

According to one embodiment, the system maps different layers of the neural network to different sets of one or more human-understandable attributes based on data sets associated with labels generated by the different layers of the neural network (Operation 214). For example, the system may apply the decision tree to a subset of data points associated with one label and one layer of the neural network to generate a first set of human-understandable attributes that correspond to the subset of data points. The system may apply the decision tree to another subset of data points associated with the same label and a different layer of the neural network to generate a second set of human-understandable attributes that correspond to the second subset of data points. The first and second sets of human-understandable attributes may be different from each other, indicating the corresponding layers of the neural network are filtering different attributes. The system may map the first set of human-understandable attributes to the first layer of the neural network and the second set of human-understandable attributes to the second layer of the neural network.

The system generates a human-understandable explanation for the output label(s) generated by the neural network using the mapping (Operation 212). For example, if the system generates a binary label, such as "fraudulent/not fraudulent," the mapping of human-understandable attributes to one or more layers of the neural network may provide an explanation for the most common reasons (i.e., the human-understandable attributes most commonly present in the subsets of data points associated with particular labels) why the neural network generated a particular label. For example, if a human-understandable attribute "multiple small transactions to the same recipient" is the most common human-understandable attribute associated with a particular label generated by the neural network, the system may generate an explanation that the neural network primarily determines whether a transaction is "fraudulent" based on whether the transaction is one of multiple small transactions to the same recipient.

In addition, or in the alternative, the system may select one or more network layers to provide human-understandable reasons for particular labels generated by a neural network (Operation 218). For example, a subset of data points associated with transactions labeled "fraudulent" by a neural network may not be associated with any particular human-understandable attribute of a decision tree beyond a threshold value. This could indicate that the particular set of human-understandable attributes that comprise a decision tree applied to the subset of data points does not include human-understandable attributes that correspond, beyond a threshold level, to the neural network's process for determining that a particular data point is associated with a fraudulent transaction. By way of example, a human may be interested in how many transactions are to unknown recipients. However, the trained neural network may recognize a pattern that fraudulent transactions were always detected on the same day of the week. Accordingly, the attribute learned by the neural network to identify a fraudulent transaction may not be one a human would consider. As a result, the human-understandable attributes that define the decision tree may not correlate to the attributes learned by the neural network to identify fraudulent transactions. However, the mapping may indicate that a hidden layer is mapped to one or more human-understandable attributes beyond the threshold level. In the example, in which the neural network is trained to identify fraudulent transactions, a hidden layer may generate a subset of data points in which the human-understandable attribute "unknown recipient" has a high confidence value. Accordingly, the system may select this hidden layer to provide a human-understandable explanation for the predictions of the neural network. In other words, the mapping of a hidden layer to particular human-understandable attributes for purposes of providing an explanation may not accurately describe the calculations performed by the neural network by the final stage of the neural network. However, they may still be used to provide the human-understandable explanation of the functioning of the neural network for purposes of providing trust that the neural network is analyzing data in a way that a human can understand. For example, if a neural network generates accurate labels that are not associated with any identified human-understandable attributes, a customer who does not understand the inner workings of the neural network may not trust that the labels are accurate, because the customer does not understand how the neural network functions. On the other hand, if one of the hidden layers is associated with a subset of data points that includes the human-understandable attributes, these human-understandable attributes may be used to provide a reason for the functioning of the neural network. The human-understandable reason, even if it is associated with a hidden layer and not the final determination by the neural network, may increase the customer's trust that the neural network is performing as it should.

4. Decision Tree Optimization

According to one or more embodiments, a system optimizes the decision tree. For example, a set of ten human-understandable attributes provided by a customer may correspond to a decision tree having twenty nodes. In an example embodiment in which a neural network is trained to identify a face in an image, a user may provide a human-understandable attribute: "two eye shapes in the middle of an oval shape." The node associated with the human-understandable attribute "two eye shapes in the middle of an oval shape" may result from a series of nodes: "oval shape," a node "eye shape," a node "two eye shapes," and a node "eye shapes in middle." The series of nodes can be arranged, parent-to-child, in any order. For example, arranging the node "oval shape" prior to the node "eye shape" results in the same subset of data points as arranging the node "eye shape" prior to the node "oval shape." The system may optimize the decision tree to maximize the amount of data that is filtered by nodes higher in the decision tree. For example, in a subset of 100 data points for which a neural network identified a face in an image, the neural network may determine that 30 of the data points included an "oval shape" and 90 of the data points included an "eye shape." Since 70 data points would be filtered out of further analysis in a branch of the decision tree based on the node: "oval shape," and only 10 data points would be filtered out of further analysis in the branch of the decision tree based on the node: "eye shape," the system may optimize the decision tree to filter out a larger quantity of data points higher in the decision tree, by arranging the node "oval shape" as a parent node to the node "eye shape" in the decision tree. Accordingly, since further decisions farther down the decision tree are analyzing fewer data points, the decision tree analysis may be performed using fewer hardware resources and in less time.

The system may optimize the decision tree using a subset of data points from a set of data points. For example, a data set may include one million data points. The system may optimize the decision tree using one thousand data points and then run the remaining hundreds of thousands of data points through the optimized decision tree, resulting in faster calculations that consume fewer system resources, such as bandwidth and processing cores.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
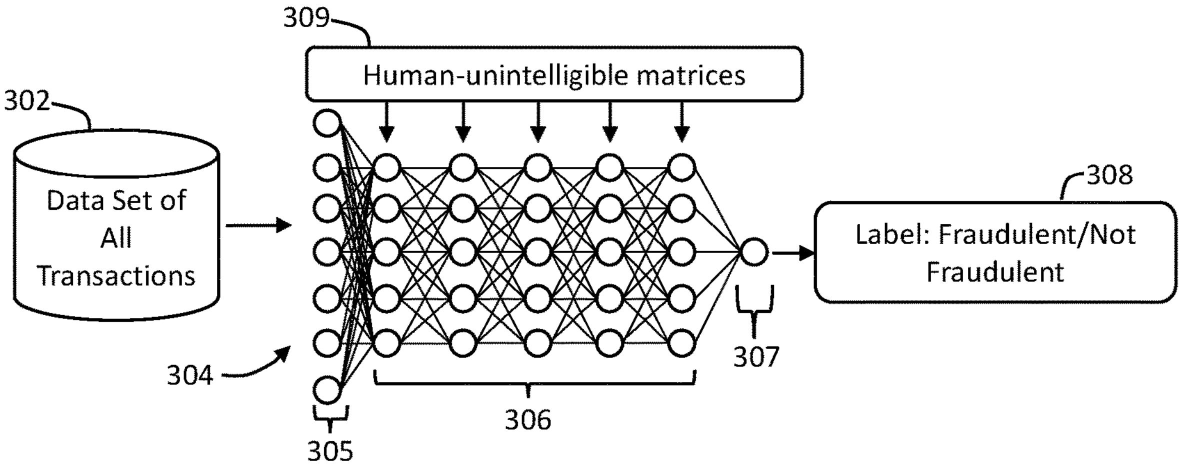
FIGS. 3A-3E illustrate an example embodiment of mapping human-understandable attributes to different layers of a trained neural network.

FIGS. 3A-3E illustrate a series of operations for mapping human-understandable attributes associated with determining whether financial transactions are fraudulent to a neural network according to an example embodiment. FIG. 3A illustrates a system including a data repository 302 storing a data set of transactions and a neural network 304 trained to generate a binary label indicating whether a particular transaction is fraudulent or not fraudulent 308. The neural network is made up of an input layer 305, five hidden layers 306, and an output layer 307. The hidden layers are made up of human-unintelligible matrices 309 representing sets of mathematical functions that make up the individual neurons of the neural network 304. The mathematical functions combine data output from each neuron of a previous layer, apply a weight to the data, apply an offset to the result, and apply an activation function to specify a range of possible output values for a particular neuron. For example, the neurons of the neural network 304 may include a differentiable nonlinear activation function, such as a rectified linear activation (ReLU) function, a logistic-type function, or a hyperbolic tangent-type function.

Figure 3B:
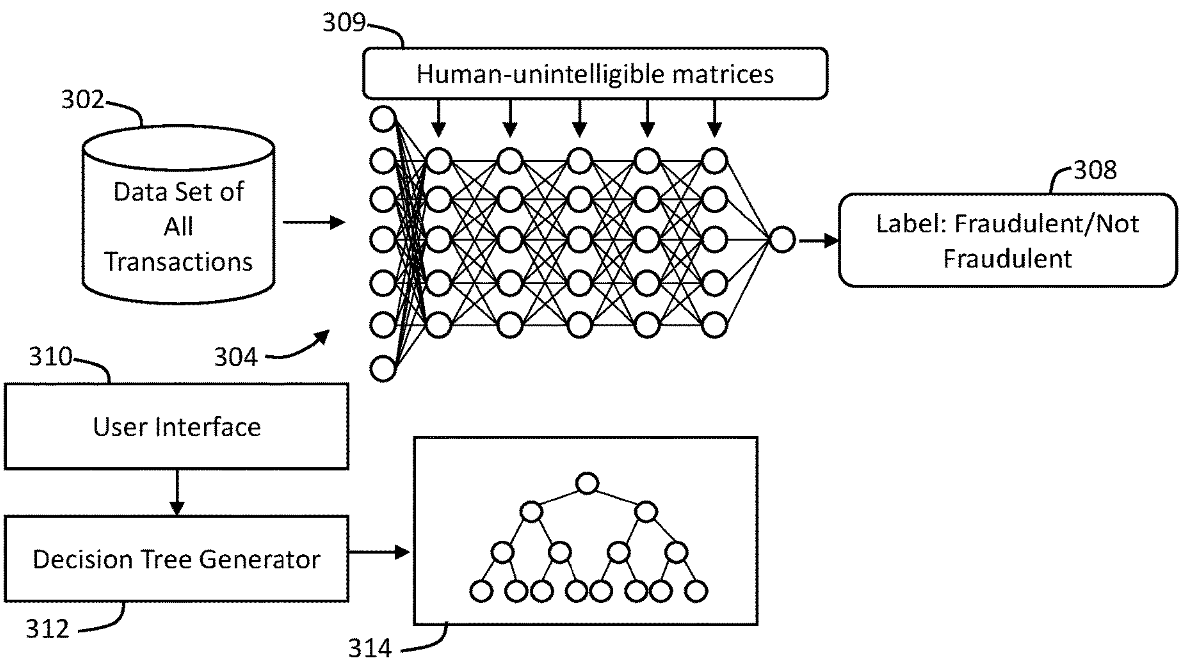

As illustrated in FIG. 3B, a decision tree generator 312 generates a decision tree 314 based on user input 310. For example, a customer may specify human-understandable attributes that the customer cares about when determining whether transactions are fraudulent or not. By specifying particular human-understandable attributes, the customer indicates that they would like to see how the neural network identifies transactions having the same human-understandable attributes. The decision tree generator 312 may generate, without receiving any human input including particular human-understandable attributes, an initial decision tree based on a fraudulent transaction glossary identifying common human-understandable terms associated with fraudulent transactions. A user may interact with the user interface 310 to modify the initial decision tree to include additional human-understandable attributes, omit human-understandable attributes, or change a parent-child relationship between nodes in the decision tree 314.

Figure 3C:
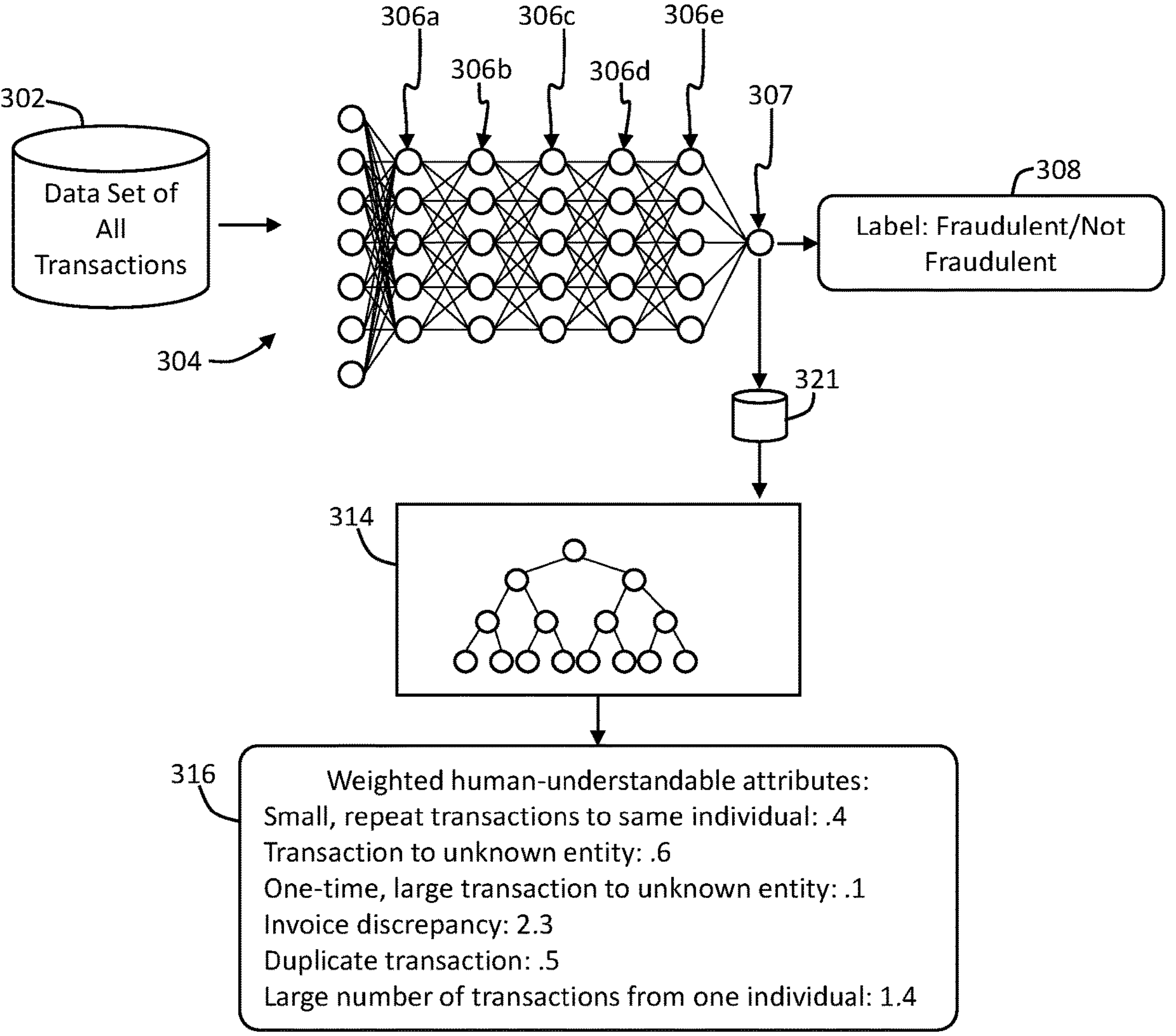

As illustrated in FIG. 3C, the system applies the decision tree 314 to a subset 321 of data points from among the data set 302. For example, the system may select all the data points from the data set 302 that were labeled "fraudulent" by the neural network 304. The subset 321 may include the data points labeled "fraudulent" and may omit the data points that are not labeled "fraudulent" by the neural network 304. Based on the frequency with which the human-understandable attributes of the decision tree 314 are present in the subset 321, the system generates confidence scores 316 associated with the respective human-understandable attributes. In the example illustrated in FIG. 3C, the system determines that a plurality of the data points in the data set 321 included an invoice discrepancy, followed by a large number of transactions from one individual, and a transaction to an unknown entity.

In the example embodiment, the system applies the output layer 307 to each hidden layer 306 of the neural network 304 without retraining the neural network 304. The system applies the output layer 307 to the hidden layers 306 to map the hidden layers to particular human-understandable attributes. Since omitting trained hidden layers 306 from the neural network 304 will necessarily reduce the accuracy of fraudulent/not fraudulent predictions generated by the neural network 304 having the hidden layers removed, the removing of the hidden layers 306 and applying the decision tree to corresponding subsets of data is performed for purposes of mapping the hidden layers to particular human-understandable attributes. The system would retain a complete instance of the neural network 304, including all the hidden layers 306, for purposes of generating accurate predictions of fraudulent/not fraudulent transactions.

Figure 3D:
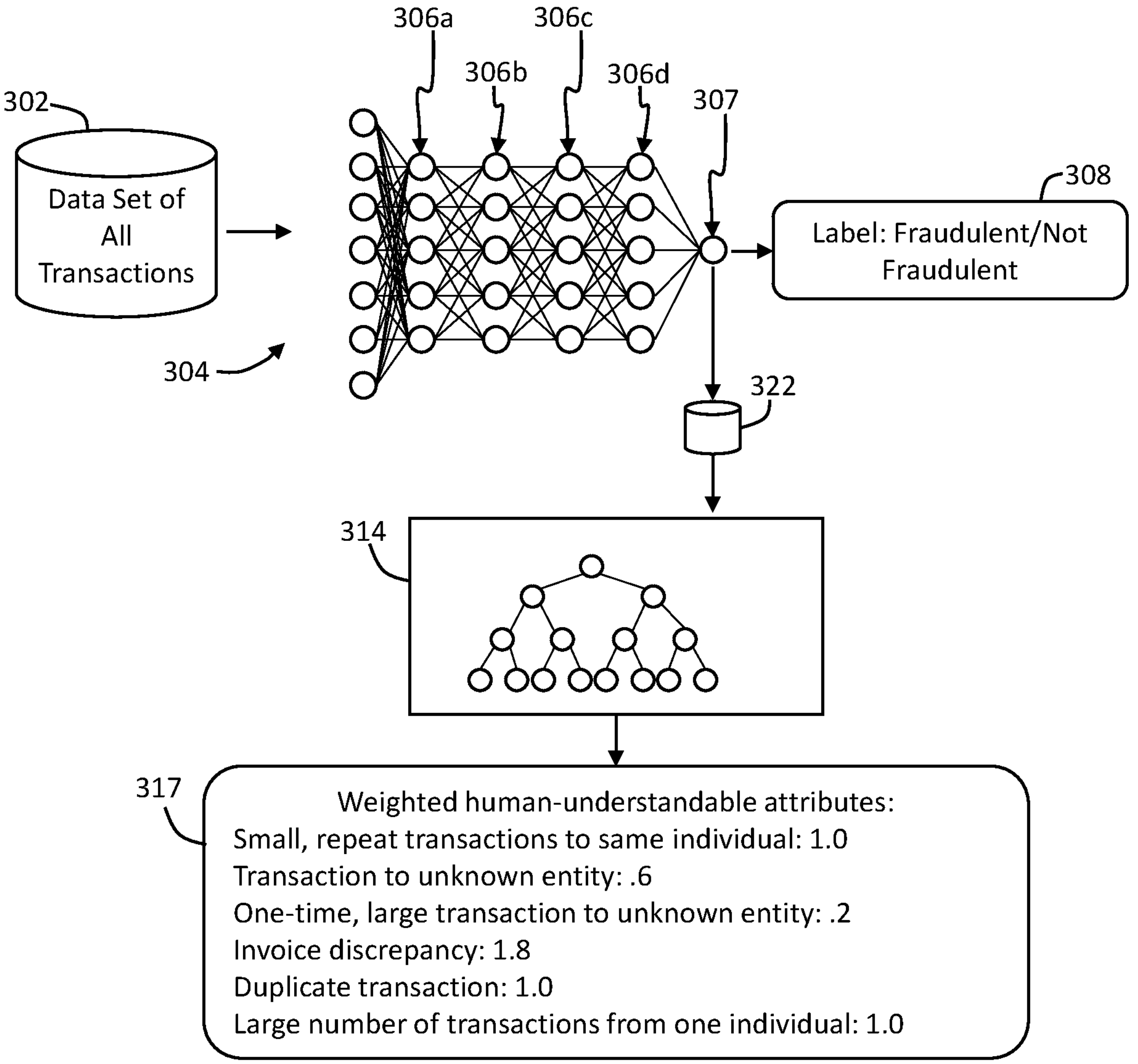
Figure 3E:
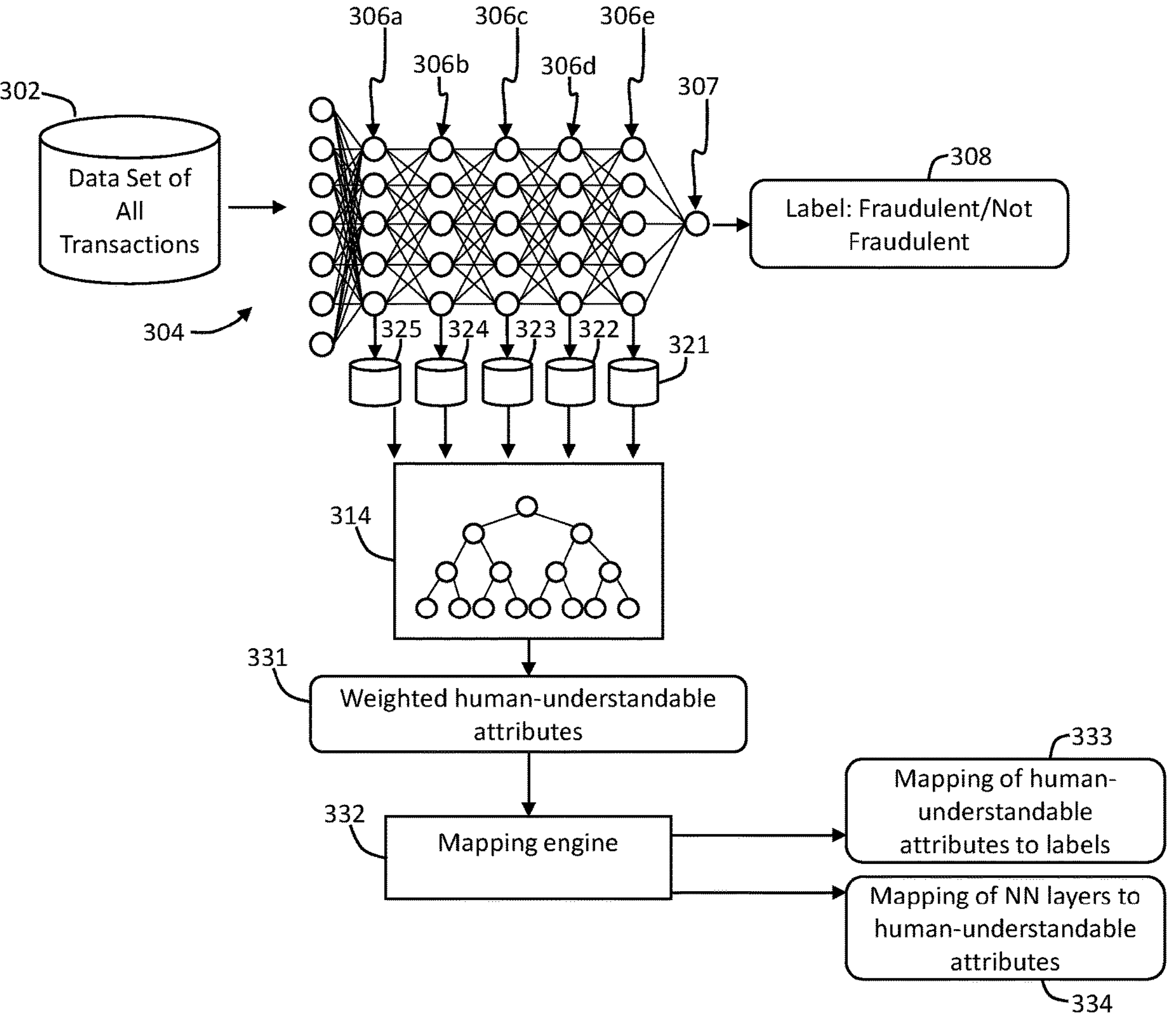

As illustrated in FIG. 3D, the system removes hidden layer 306*e* from the neural network 304, applies the output layer 307 to the hidden layer 306*d*, and generates fraudulent/not fraudulent labels 308 for the data points of the data set 302. Since the system removed the hidden layer 306, the subset 322 of data points labeled "fraudulent" by the neural network 304 may be different than the subset 321 of data points labeled "fraudulent" when the hidden layer 306*e* was included in the neural network 304. According to one embodiment, the output layer 307 applied to the hidden layer 306*d* is the same as the output layer 307 applied to the hidden layer 306*e*. In other words, the mathematical formulae that define the output layer (i.e., the combination of values from the previous hidden layer, the weights applied to those values, any offsets applied to the combination, and any activation function applied to the combination) is the same. The only difference is that the values for the inputs to the output layer 307 are obtained from the neurons in the hidden layer 306*d* instead of the hidden layer 306*e*.

According to another embodiment, the output layer 307 may be replaced by a simple summing or averaging function and activation function when applied to the hidden layers 306*a*-306*d*. For example, the output layer 307 illustrated in FIG. 3C may be represented by a formula:

$$f(z)=\sum\nolimits_{k=0}^{i} w^i x^i + b.$$

The result may be bounded by a particular activation function, such as a ReLU-type function or sigmoid-type function. As discussed above, the same output layer 307 may be applied to the hidden layer 306*d*, as illustrated in FIG. 3D. However, according to an alternative embodiment, the output layer 307 illustrated in FIG. 3D may be a simple summing layer, such as $$f(z)=\sum\nolimits_{k=0}^{i} x^i$$

and the activation function may be a simple comparison of the sum to a particular value, such as "2.5." For example, if the output layer is a single binary output, as illustrated in FIG. 3D, the activation function associated with the output layer 307 may simply generate an output value "1" if more of the neurons of the hidden layer 306*d* are activated than not activated. Otherwise, the output layer may generate and output value of "0." In embodiments in which the output layer 307 of FIG. 3C is replaced by a simple summing function, the activation functions associated with the remaining hidden layers 306*a*-306*d* of the neural network remain unchanged. For example, the functions associated with the hidden layers 306*a*-306*d* may be represented as a function:

$$f(z)=\sum\nolimits_{k=0}^{i} w^i x^i + b.$$

In addition, each hidden layer 306*a*-306*d* may include a same activation function, such as a ReLU-type activation function or a sigmoid-type activation function.

The system repeats the process of removing hidden layers 306*d*, 306*c*, and 306*b* and applying the output layer 307 to the end hidden layer in the modified neural network 304 to generate different subsets 323, 324, and 325 associated with the hidden layers 306*a*, 306*b*, and 306*c*. The system applies the subsets 323, 324, and 325 of data points to the decision tree 314 to generate different sets of confidence scores for human-understandable attributes based on the frequency with which the human-understandable attributes are present in the subsets 323, 324, and 325 of data points.

The system generates sets of weighted human-understandable attributes 331 based on the results of applying the decision tree 314 to the subsets 321-325 of data points. The weighted human-understandable attributes 331 may include confidence scores associated with the human-understandable attributes for each subset 321-325 of data points. A mapping engine 332 maps the human-understandable attributes to the neural network 304 based on the weighted human-understandable attributes 331. The mapping engine 332 may map the human-understandable attributes having the highest confidence scores to a particular label to generate a mapping 333 of human-understandable attributes to labels. For example, the system may determine that three human-understandable attributes identified in the decision tree 314 were present in more data points of the data subset 321 than other human-understandable attributes, where the data subset is associated with a "fraudulent" label when the output layer 307 is applied to the last hidden layer 306*e*. Accordingly, the system may map the three human-understandable attributes to the label "fraudulent."

The mapping engine 332 generates a mapping of neural network layers to human-understandable attributes 334. The weighted human-understandable attributes 331 may indicate that a first set of three human-understandable attributes in the decision tree 314 is most prevalent in the subset 322 of data points. The weighted human-understandable attributes 331 may indicate that a second set of three human-understandable attributes, different from the first set of three human-understandable attributes, in the decision tree 314 is most prevalent in the subset 323 of data points. The mapping 334 maps the first set of human-understandable attributes to the hidden layer 306*d* and the second set of human-understandable attributes to the hidden layer 306*c*.

Figure 4A:
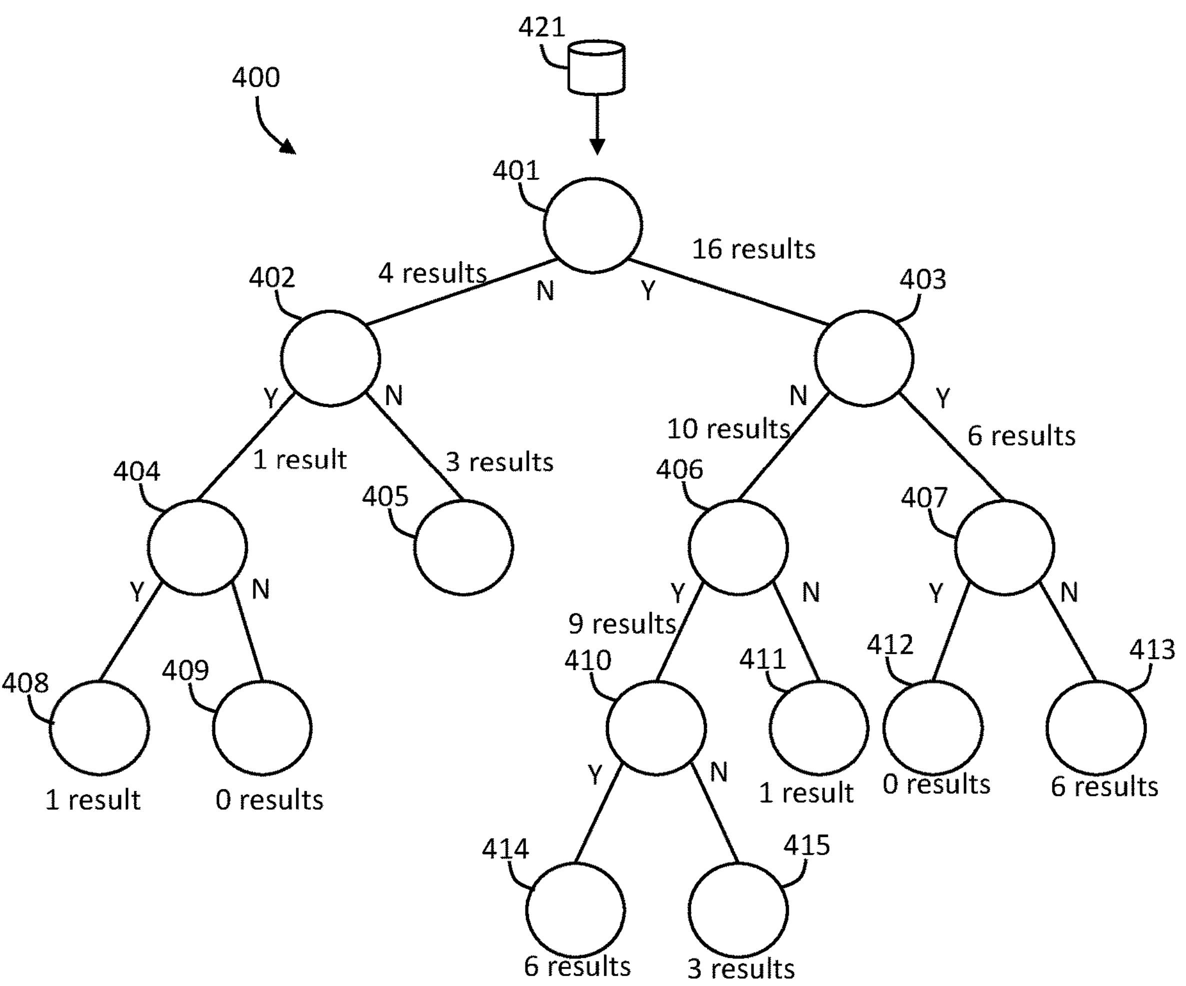
FIGS. 4A-4C illustrate an example embodiment of applying data subsets to a decision tree according to an embodiment.
Figure 4B:
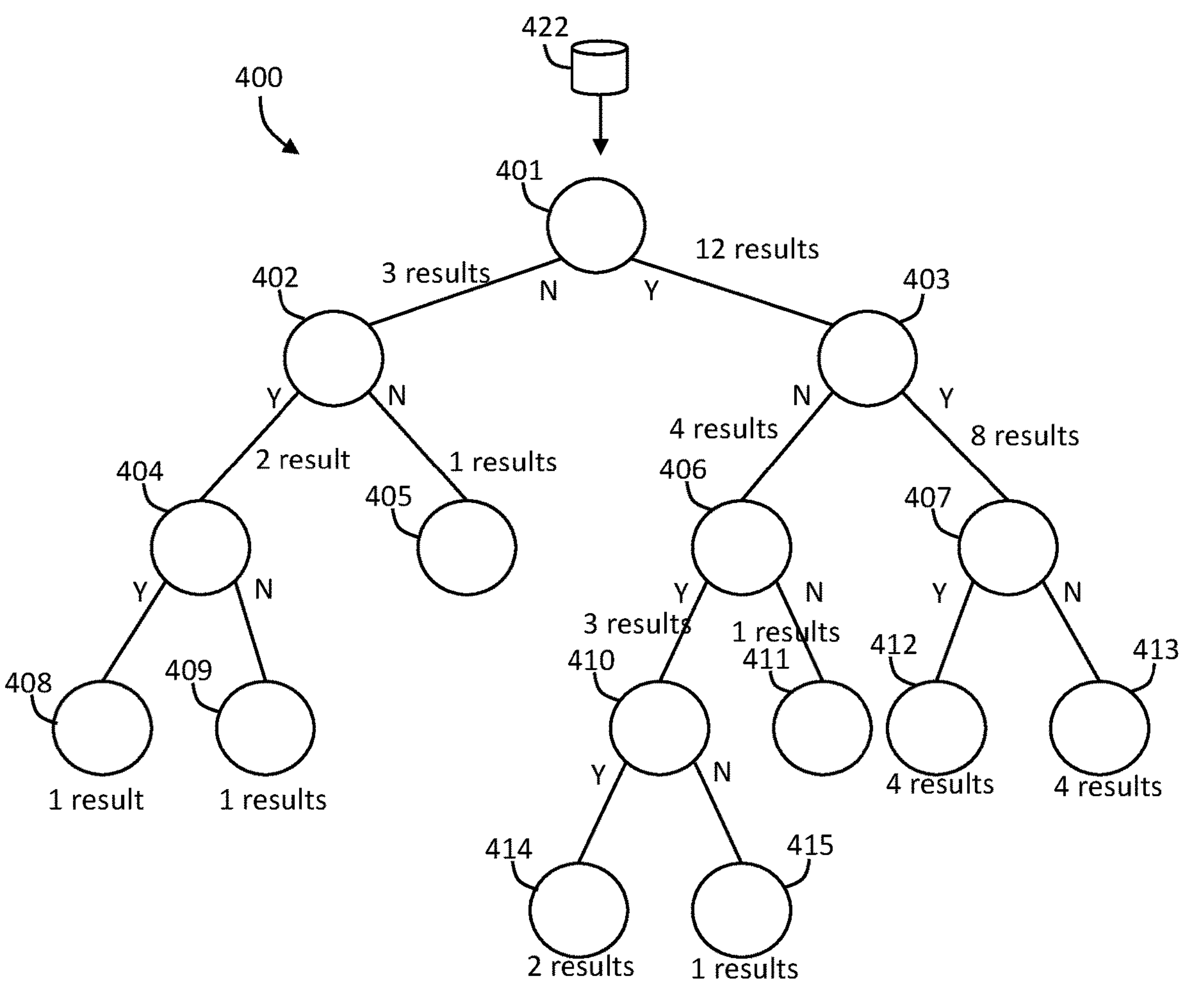
Figure 4C:
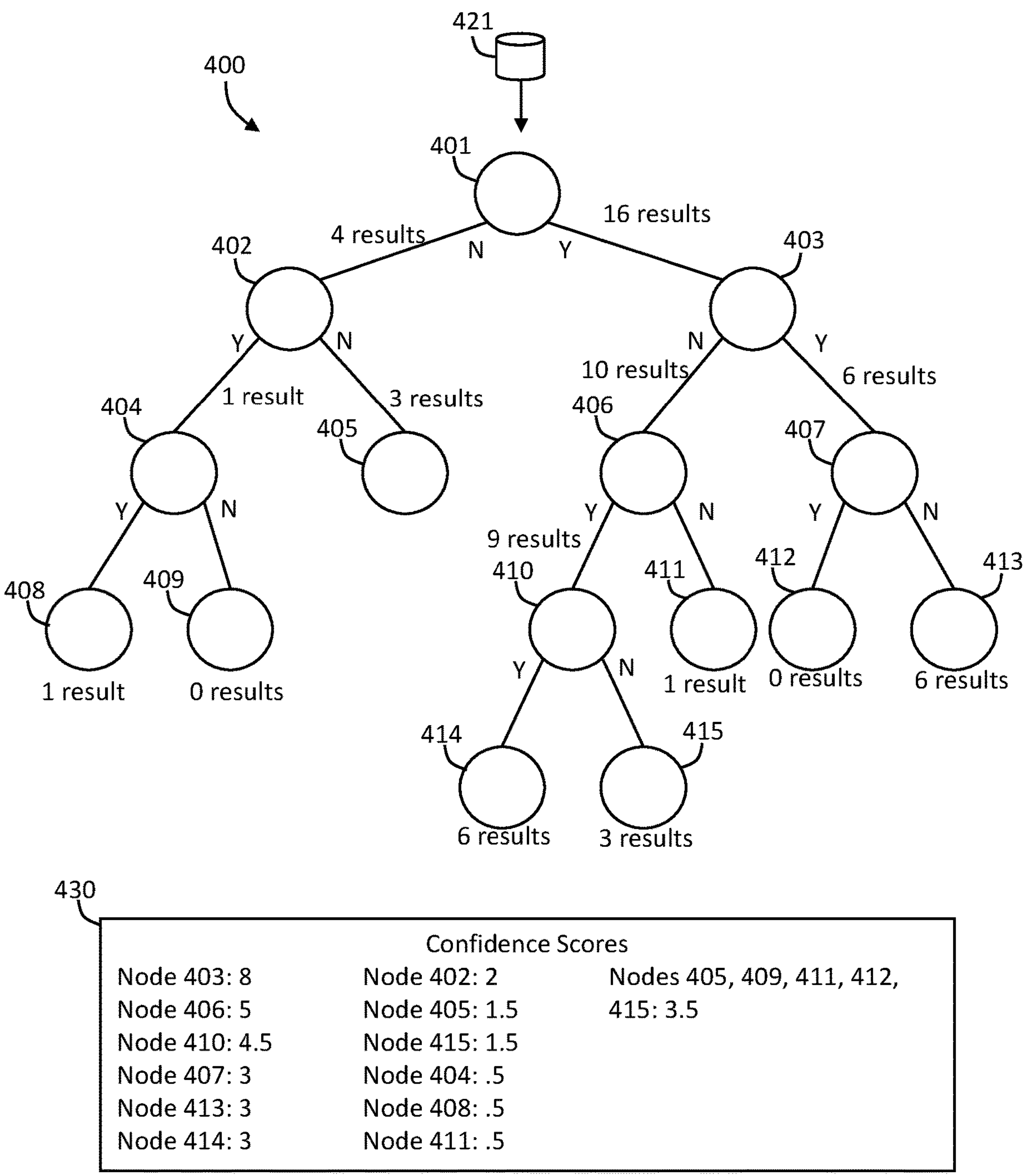

FIGS. 4A-4C illustrate an example of a decision tree 400 according to an exemplary embodiment. The decision tree 400 may correspond to the decision tree 314 of FIGS. 3B-3E. The decision tree includes the following human-understandable attributes: "was the financial transaction associated with an unknown recipient?" "Was the transaction a large, one-time transaction to an unknown recipient?" "Was the transaction a duplicate transaction?" "Was the transaction one of a set of duplicate transactions from the same sender?" "Was the transaction one of a large number of transactions to the same recipient?" Based on the human-understandable attributes, a decision tree generator generates a decision tree with nodes 401 (known recipient?), 402 (large amount?), 403 (duplicate transaction?), 404 (one-time transaction?), 406 (one of multiple transactions to same recipient?), 407 (one of multiple duplicate transactions from same sender?), and 410 (transaction one of a large number of transactions to the same recipient?). Nodes 408, 409, 405, 411, 412, 413, 414, and 415 represent the number of data points associated with particular human-understandable attributes. For example, node 408 includes 1 result, indicating that one transaction among the subset 421 was a one-time transaction, of a large amount, to an unknown recipient. Node 409 includes 0 results, indicating no transactions, among the subset 421, was a repeat transaction, of a large amount, to an unknown recipient. Node 405 includes 3 results, indicating 3 transactions, among the subset 421, were less than the large amount and were sent to an unknown recipient. Node 411 includes 1 result, indicating 1 transaction, among the subset 421, was a transaction to a known recipient, was not a duplicate amount, and was not a repeat transaction to the same recipient. Node 412 includes 0 results, indicating 0 transactions, among the subset 421, were duplicate transactions from different senders. Node 413 includes 6 results, indicating 6 transactions, among the subset 421, were duplicate transactions from the same sender. Node 414 includes 6 results, indicating 6 transactions, among the subset 421 were repeat transactions, of a large number of transactions, to the same recipient. Node 415 includes 3 results, indicating 3 transactions, among the subset 421 were repeat transactions, of a number of transactions less than the "large" number of transactions, to the same recipient. While nodes 403, 408, 407, 412, and 414 include results associated with the specified human-understandable attributes by specifying the number of transactions that include the specified human-understandable attributes, nodes 405, 415, 411, and 413 indicate that a certain number of transactions were identified as fraudulent based on criteria other than the human-understandable attributes.

FIG. 4B illustrates applying the decision tree 400 to a different subset 422 of data points. For example, the subset 421 may correspond to the subset 321 of FIG. 3E and the subset 422 may correspond to the subset 322 of FIG. 3E. The different subsets 422 and 423 are generated by applying an output layer of a neural network to different hidden layers and determining the subset of data points designated by the neural network as associated with the "fraudulent" or "not fraudulent" label for the respective hidden layers. As illustrated in FIG. 4B, the number of results associated with the nodes 401-415 is different for the subset 422 than for the subset 421. For example, applying the output layer of the neural network to the hidden layer 306*e* may return the subset 421 including 6 results, associated with node 413, that were duplicate transactions from the same sender. However, applying the output layer of the neural network to the hidden layer 306*d* may return the subset 422 including 4 results, associated with node 413, that were duplicate transactions from the same sender. Accordingly, different subsets of data points, such as subsets 321-325 of FIG. 3E, associated with different hidden layers of a neural network, may be mapped to different human-understandable attributes based on the number of data points in the respective subsets that include different human-understandable attributes.

FIG. 4C illustrates an example of generating confidence scores 430 associated with nodes in a decision tree, according to one embodiment. In the example illustrated in FIG. 4C, a system calculates a confidence score based on a ratio of results associated with a particular node to a total number of results associated with a label. For example, the subset 421 is made up of 20 results that the neural network identified as "fraudulent." The system generates a confidence score for the node 413, associated with the human-understandable attribute "duplicate transactions from the same sender," by determining how many of the total "fraudulent" results included the attribute "duplicate transactions from the same sender." Since node 413 is associated with 6 results, the system calculates the confidence score as: 6/20=0.3×10=3. The system calculates the confidence scores for the additional nodes in the same manner. The system may also calculate a confidence score associated with nodes that do not correspond to human-understandable attributes. For example, node 405 includes results that were found to be fraudulent by the neural network and were sent to an unknown recipient, but were not a "large amount" (Node 402 decision). Similarly, node 415 includes 3 results that were found to be fraudulent by the neural network but were: (a) sent to a known recipient (Node 401 decision), (b) were not a duplicate transaction amount (Node 403 decision), were one of a number of transactions to the same recipient (Node 406 decision), but were not one of a "large" number of transactions to the same recipient (Node 410 decision). The system may sum the confidence scores for the nodes that do not correspond to human-understandable attributes to determine how well the decision tree captures human-understandable attributes associated with fraudulent transactions. For example, if the sum of confidence scores associated with nodes that do not correspond to human-understandable attributes is higher than a threshold value, such as a sum of confidence scores of nodes that are associated with human-understandable attributes, the system may determine that the decision tree does not accurately capture human-understandable attributes associated with fraudulent transactions. The system may recommend alternative human-understandable attributes for nodes of the decision tree.

FIGS. 5A-5E illustrate an example embodiment in which an output layer of a neural network is applied to the hidden layers of the neural network to generate subsets of data points according to an embodiment. The trained neural network 504 may correspond to the trained neural network 304 of FIG. 3E. The trained neural network 504 includes an input layer 505, hidden layers 506*a*-506*e*, and an output layer 507. The input layer 505 receives as an input a vector 510 including a sequence of numbers representing attributes of a financial transaction. The input layer 505 in the embodiment of FIG. 5A converts the values of the input vector to either a 0 or a 1. The neurons in the hidden layers 506*a*-506*e* receive as inputs the weighted sum of each neuron of a previous layer. For example, neuron 511 receives as an input the weighted sum of the neurons of the input layer 505. The neuron 512 also receives as an input the weighted sum of the neurons of the input layer 505. However, during training of the neural network 504 the system adjusts the weights at each neuron of the neural network such that no two neurons are likely to have the same weights applied to input values. Similarly, neuron 513 receives as an input the weighted sum of the values of the neurons in hidden layer 506*a*. In the example embodiment illustrated in FIGS. 5A-5E, the neurons include activation functions that return a value of 0 or 1 for purposes of simplicity in explanation. For example, the neuron 513 receives the input values 1, 1, 0, 1, 0 and applies predetermined weights to the values, based on the training of the neural network. According to one example, the weights are: 0.8, 0.7, 0.6, 0.1, 0.4. The neuron 13 applies an activation function to the resulting value (i.e., 1.6) to generate an output value 1. While FIGS. 5A-5E illustrate an activation function that returns a value of 1 or 0, for purposes of simplicity in explanation, embodiments of the invention encompass any activation function, including linear activation functions and non-linear activation functions. Examples of activation functions include ReLU-type activation functions, sigmoid-type activation functions, and hyperbolic tangent (Tan h)-type activation functions.

The output layer 507 illustrated in FIGS. 5A-5E includes a simple averaging function for purposes of simplicity in explanation. The summing function may add the inputs, divide by 5, and set the value to 1 if the result is 0.5 or greater and set the value to 0 if the result is less than 0.5. While a simple activation function is provided in FIGS.

5A-5E for purposes of clarity, embodiments of the invention encompass any type of activation function at the output layer 507.

FIGS. 5A-5E illustrate a set of input values associated with a single input vector 510, associated with a single financial transaction, and corresponding output values for each neuron in the neural network 504 based on the particular input vector 510. According to one or more embodiments, different financial transactions are associated with different values for an input vector 510 and would result in different output values at the neurons of the neural network 504.

The system applies the neural network 504 to the input vector 510 associated with one data point and one financial transaction to generate an output value "1," indicating the financial transaction is "fraudulent." The system includes the data point in a subset of data points that include the transactions identified by the neural network 504 as being fraudulent.

Figure 5A:
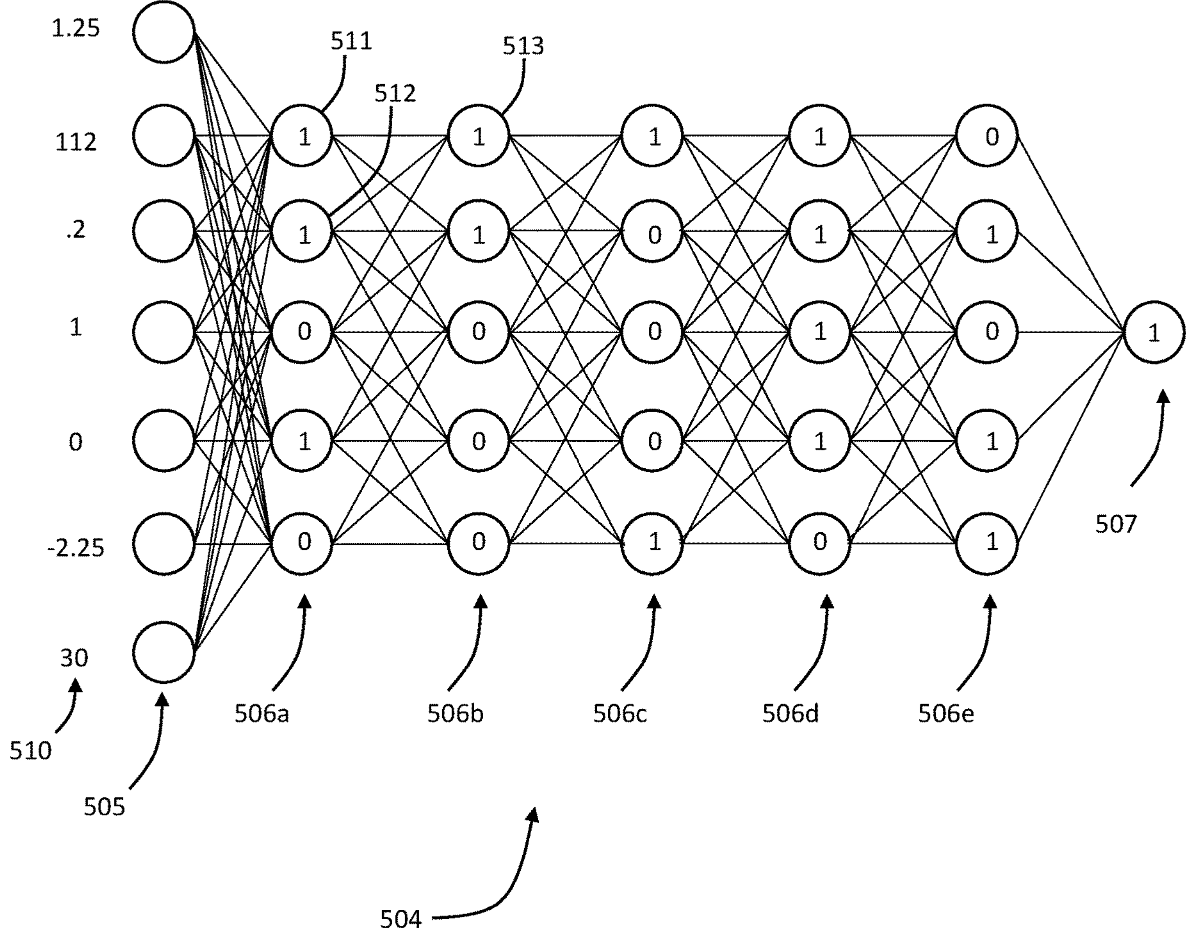
FIGS. 5A-5E illustrate an example embodiment of applying an output layer to hidden layers in a trained neural network according to an embodiment.
Figure 5B:
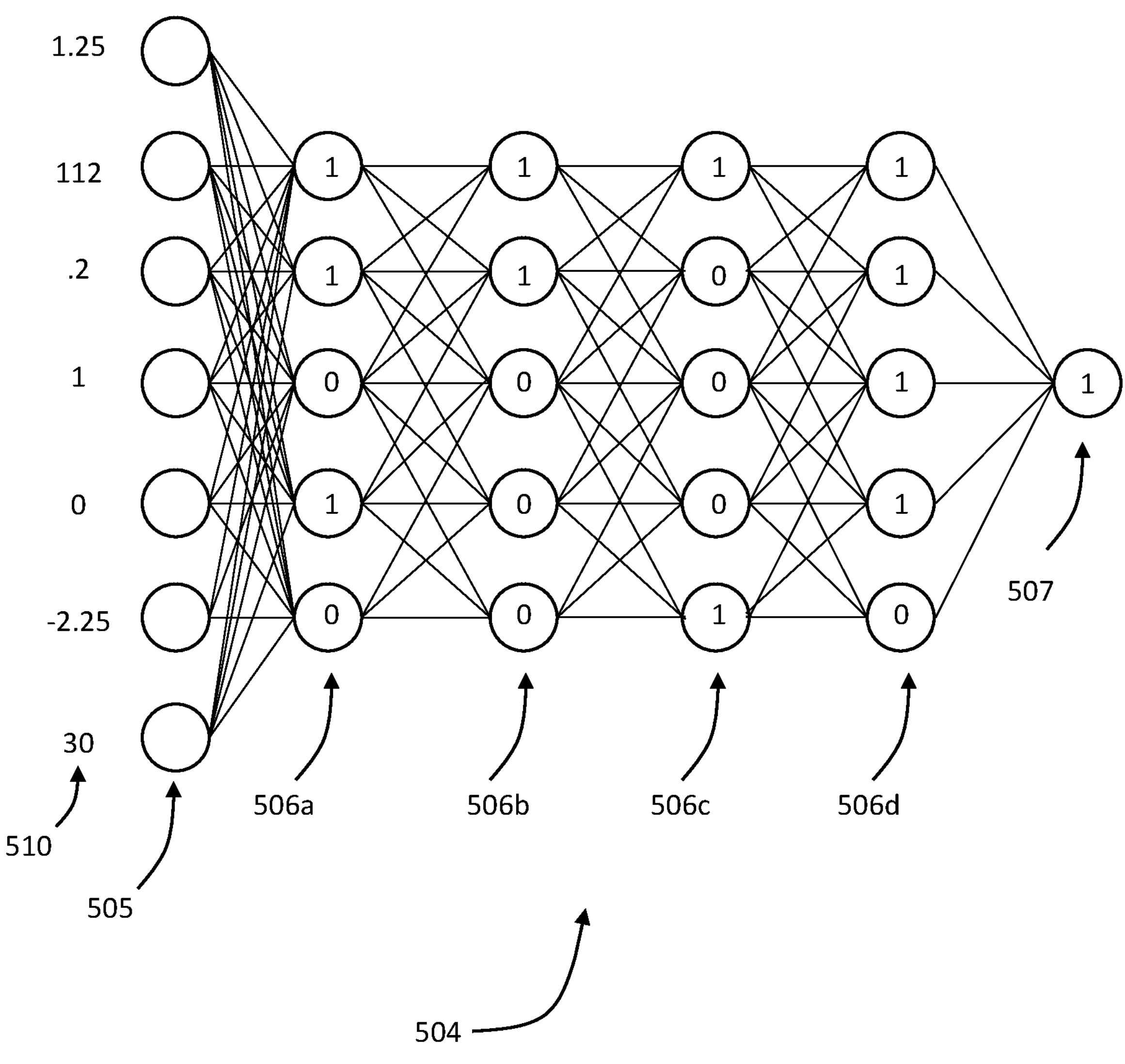

Referring to FIG. 5B, the system removes the hidden layer 506*e* from the neural network and applies the output layer 507 to the hidden layer 506*d*. When the system applies the neural network 504 to the vector 510, the output layer 507 returns a value "1," indicating the transaction associated with the vector 510 would be classified as "fraudulent." The system includes the data point in a subset of data points (such as subset 322 of FIG. 3E) that include the transactions identified by the hidden layer 506*d* as being fraudulent.

Figure 5C:
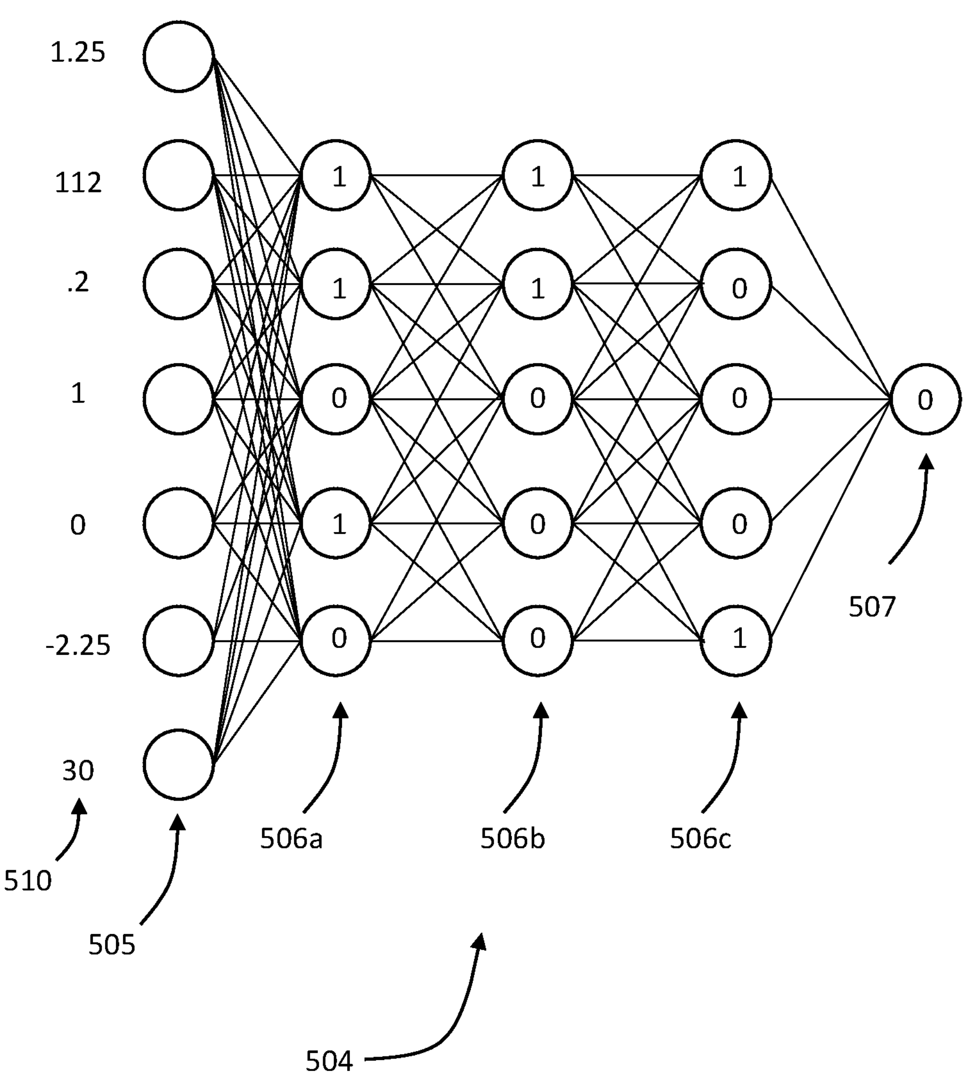

Referring to FIG. 5C, the system removes the hidden layer 506*d* from the neural network and applies the output layer 507 to the hidden layer 506*c*. When the system applies the neural network 504 to the vector 510, the output layer 507 returns a value "0," indicating the transaction associated with the vector 510 would be classified as "not fraudulent." The system does not include the data point in a subset of data points (such as subset 323 of FIG. 3E) that include the transactions identified by the hidden layer 506*c* as being fraudulent.

Figure 5D:
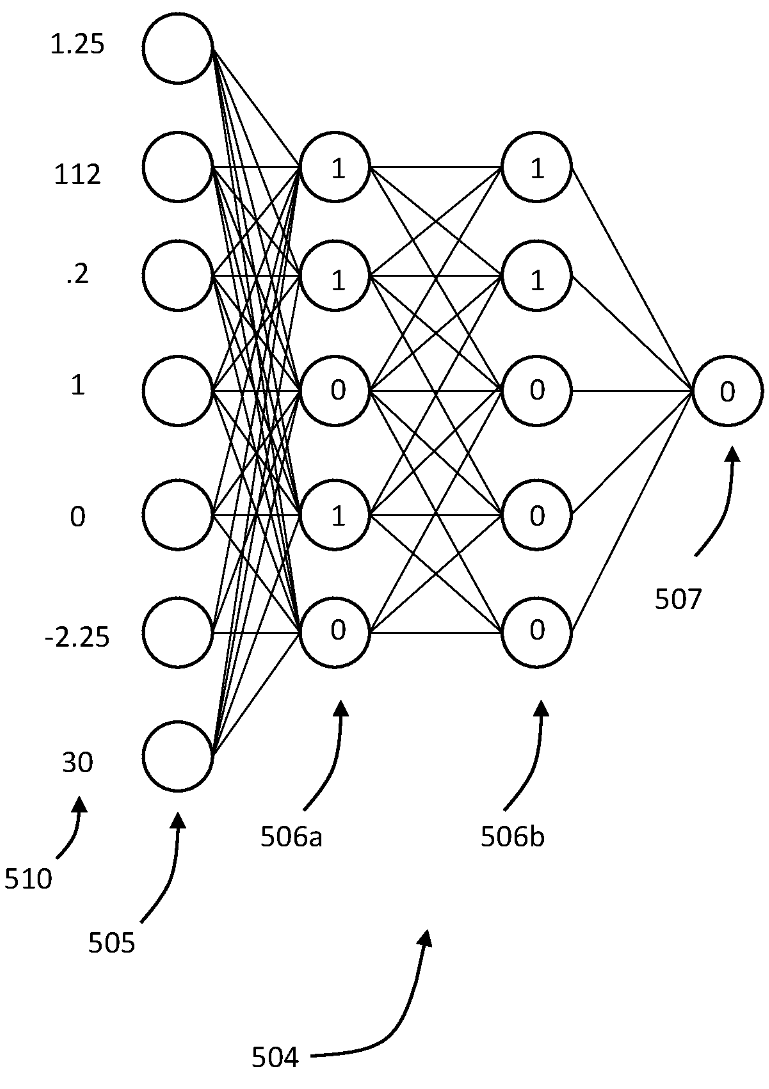

Referring to FIG. 5D, the system removes the hidden layer 506*c* from the neural network and applies the output layer 507 to the hidden layer 506*b*. When the system applies the neural network 504 to the vector 510, the output layer 507 returns a value "0," indicating the transaction associated with the vector 510 would be classified as "not fraudulent." The system does not include the data point in a subset of data points (such as subset 324 of FIG. 3E) that include the transactions identified by the hidden layer 506*b* as being fraudulent.

Figure 5E:
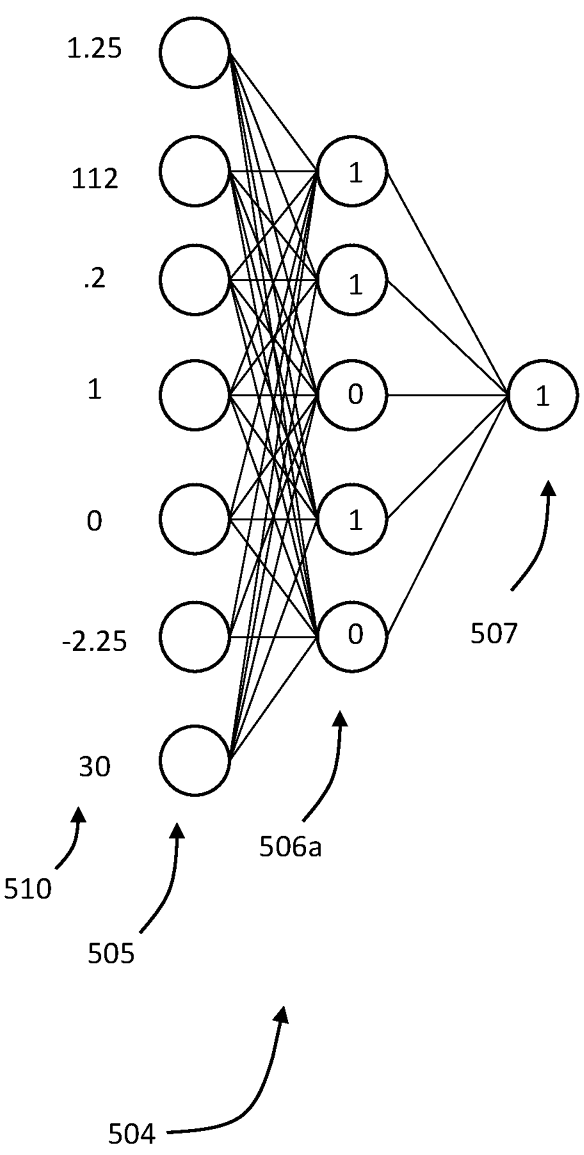

Referring to FIG. 5E, the system removes the hidden layer 506*b* from the neural network and applies the output layer 507 to the hidden layer 506*a*. When the system applies the neural network 504 to the vector 510, the output layer 507 returns a value "0," indicating the transaction associated with the vector 510 would be classified as "not fraudulent." The system includes the data point in a subset of data points (such as subset 325 of FIG. 3E) that include the transactions identified by the hidden layer 506*a* as being fraudulent.

According to the example embodiments illustrated in FIGS. 3A-3E, 4A-4C, and 5A-5E, a system applies a decision tree to subsets of data associated with one or more layers of a neural network and one or more labels generated by an output layer of the neural network to map human-understandable attributes to one or both of a label generated by the neural network and a layer of the neural network.

6. Computer Networks and Cloud Networks

In one or more embodiments, the decision tree analysis engine, the neural network engine, and the decision tree generator are implemented in a computer network which provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
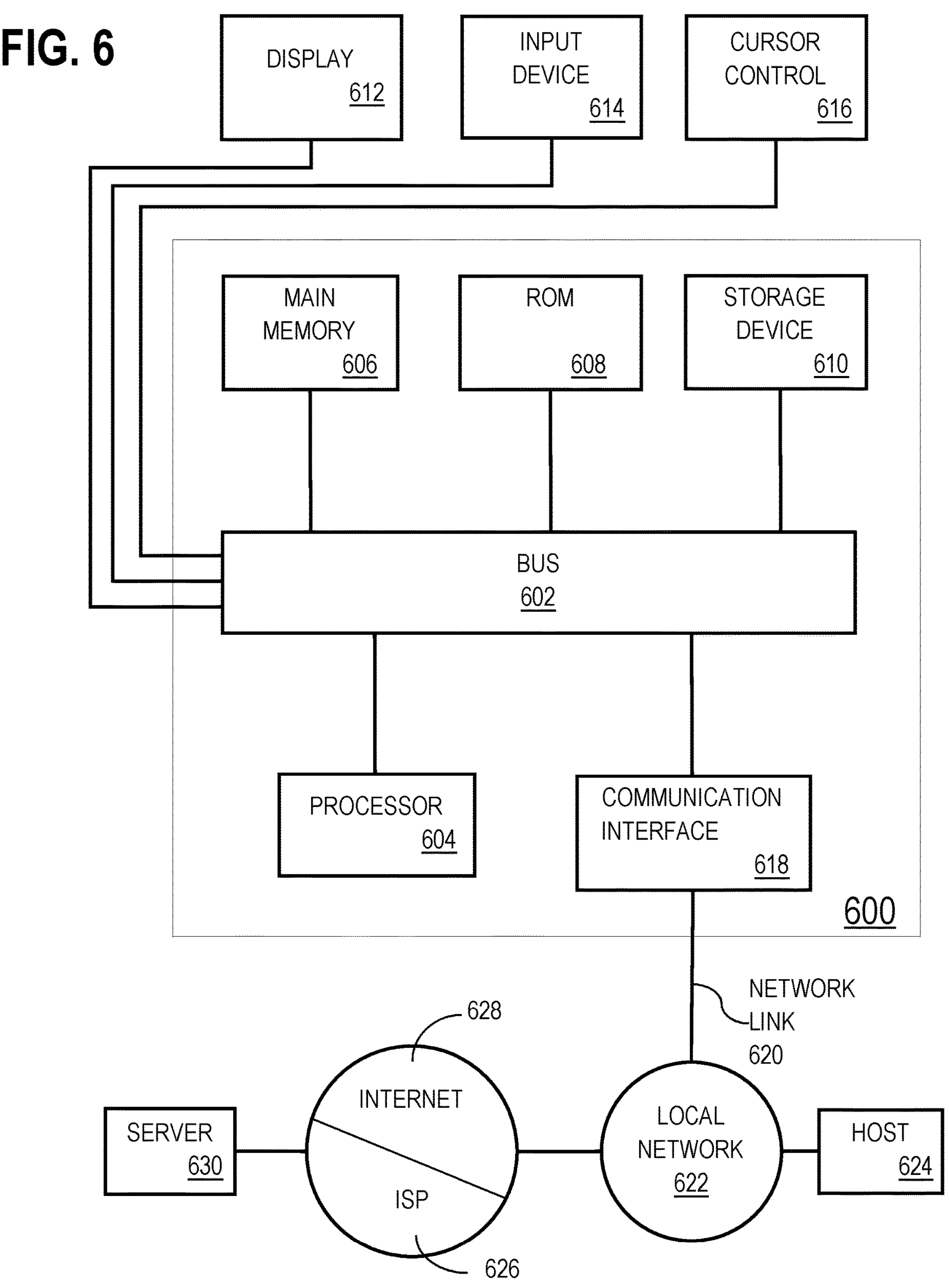
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:

identifying a training data set comprising a plurality of data points, each data point of the plurality of data points being associated with (a) a label and (b) a corresponding set of attributes;

using the training data set to train a neural network to generate a classification for a target data point, wherein the trained neural network comprises an input layer, a plurality of hidden layers, and an output layer, wherein attributes of the target data point are used to compute information for an initial hidden layer of the plurality of hidden layers, wherein information for each of the hidden layers, prior to a final hidden layer, is used to compute information for a next hidden layer in the plurality of hidden layers, wherein information for the final hidden layer of the plurality of hidden layers is used to compute the output layer, and wherein the output layer corresponds to the classification of the target data point;

generating insight for a first hidden layer of the trained neural network at least by:

modifying the trained neural network to generate a first modified neural network at least by re-configuring the first hidden layer of the trained neural network from (a) being used to compute the next hidden layer to (b) being used to compute the output layer, for the first modified neural network, corresponding to the classification for the target data point;

applying the first modified neural network to the a set of data points to compute a classification for a first subset of the set of data points, wherein the first modified neural network computes the classification from values determined for the output layer, the values determined for the output layer being based on values determined for the first hidden layer; and based on determining the first subset of the set of data points corresponds to the classification, identifying a first number of data points, in the first subset of data points, that are associated with a first attribute;

modifying the trained neural network to generate a second modified neural network at least by re-configuring a second hidden layer of the trained neural network from (a) being used to compute a second next hidden layer to (b) being used to compute the output layer for the second modified neural network corresponding to the classification for the target data point;

applying the second modified neural network to the set of data points to compute the classification for a second subset of the set of data points;

identifying a second number of data points, in the second subset of data points, that are associated with the first attribute;

comparing the first number of data points with the second number of data points; and based on determining the first number of data points is greater than the second number of data points:

mapping the first hidden layer to the first attribute to indicate that at least the first hidden layer is used to compute a value for the first attribute; and refraining from mapping the second hidden layer to the first attribute.

2. The non-transitory computer readable medium of claim 1, wherein the operations further comprise:

based at least on (a) the first number of data points, of the data points in the first subset of data points, that are associated with the first attribute and (b) the first modified neural network computing the classification based on the first subset of the set of data points:

determining that the first attribute was influential for the first modified neural network to compute the classification; and responsive to determining that the first attribute was influential for the first modified neural network to compute the classification, generating a mapping associating the first attribute to the classification.

3. The non-transitory computer readable medium of claim 1, wherein identifying the first number of data points that are associated with the first attribute comprises applying a decision tree to each of the first subset of data points to determine whether each of the first subset of data points is associated with the first attribute, wherein the decision tree comprises a plurality of nodes, and wherein the plurality of nodes of the decision tree correspond to a plurality of textual descriptions of a plurality of attributes, including the first attribute.

4. The non-transitory computer readable medium of claim 3, wherein the operations further comprise:

generating a set of confidence scores corresponding, respectively, to the plurality of attributes, based on the respective number of data points that are associated with respective nodes of the decision tree; and based on a subset of the confidence scores meeting a threshold value: associating a subset of attributes corresponding to the subset of confidence scores with the classification.

5. The non-transitory computer readable medium of claim 4, wherein the operations further comprise:

generating the decision tree at least by:

applying a second set of data points to the decision tree;

determining ratios in which the second set of data points is distributed among the plurality of nodes; and optimizing the decision tree by re-organizing the plurality of nodes based on the ratios in which the second set of data points is distributed among the plurality of nodes.

6. The non-transitory computer readable medium of claim 1, wherein identifying the first number of data points, in the first subset of data points, that are associated with the first attribute, comprises:

obtaining a decision tree comprising a plurality of nodes, wherein each node of the decision tree represents a respective attribute, among a plurality of attributes; and applying the decision tree to the first subset of data points to:

identify a first number of data points that are associated with a first node of the decision tree, the first node corresponding to the first attribute;

identify a second number of data points that are associated with a second node of the decision tree, the second node corresponding to a second attribute;

based on determining that the first number of data points is greater than the second number of data points:

mapping the first attribute to the classification; and refraining from mapping the second attribute to the classification.

7. The non-transitory computer readable medium of claim 1, wherein the operations further comprise: determining that the first hidden layer identifies the first attribute as a contributing factor for the classification based at least on the first number of data points, of the data points in the first subset of data points, that are associated with the first attribute.

8. The non-transitory computer readable medium of claim 1, wherein the attributes of the target data point are used to compute the information for the initial hidden layer of the plurality of hidden layers at least by:

converting the attributes into numerical format to generate an input vector; and applying the input vector to an input layer of the neural network to compute the information for the initial hidden layer of the plurality of hidden layers, wherein the first attribute is not among the attributes of the target data point converted into numerical format to generate the input vector.

9. The non-transitory computer readable medium of claim 1, wherein applying the first modified neural network to the set of data points to compute the classification for the first subset of the set of data points comprises:

applying the first modified neural network to a first data point, of the set of data points, to compute the classification for the first data point; and applying the first modified neural network to a second data point, of the set of data points, to compute the classification for the second data point, wherein generating the mapping is based in part on the first data point and the second data point both being associated with the first attribute.

10. A method comprising:

identifying a training data set comprising a plurality of data points, each data point of the plurality of data points being associated with (a) a label and (b) a corresponding set of attributes;

using the training data set to train a neural network to generate a classification for a target data point, wherein the trained neural network comprises an input layer, a plurality of hidden layers, and an output layer, wherein attributes of the target data point are used to compute information for an initial hidden layer of the plurality of hidden layers, wherein information for each of the hidden layers, prior to a final hidden layer, is used to compute information for a next hidden layer in the plurality of hidden layers, wherein information for the final hidden layer of the plurality of hidden layers is used to compute the output layer, and wherein the output layer corresponds to the classification of the target data point;

generating insight for a first hidden layer of the trained neural network at least by:

modifying the trained neural network to generate a first modified neural network at least by re-configuring the first hidden layer of the trained neural network from (a) being used to compute the next hidden layer to (b) being used to compute the output layer, for the first modified neural network, corresponding to the classification for the target data point;

applying the first modified neural network to a set of data points to compute a classification for a first subset of the set of data points, wherein the first modified neural network computes the classification from values determined for the output layer, the values determined for the output layer being based on values determined for the first hidden layer; and based on determining the first subset of the set of data points corresponds to the classification, identifying a first number of data points, in the first subset of data points, that are associated with a first attribute;

modifying the trained neural network to generate a second modified neural network at least by re-configuring a second hidden layer of the trained neural network from (a) being used to compute a second next hidden layer to (b) being used to compute the output layer for the second modified neural network corresponding to the classification for the target data point;

applying the second modified neural network to the set of data points to compute the classification for a second subset of the set of data points;

identifying a second number of data points, in the second subset of data points, that are associated with the first attribute;

comparing the first number of data points with the second number of data points; and based on determining the first number of data points is greater than the second number of data points:

mapping the first hidden layer to the first attribute to indicate that at least the first hidden layer is used to compute a value for the first attribute; and refraining from mapping the second hidden layer to the first attribute.

11. The method of claim 10, further comprising:

based at least on (a) the first number of data points, of the data points in the first subset of data points, that are associated with the first attribute and (b) the first modified neural network computing the classification based on the first subset of the set of data points:

determining that the first attribute was influential for the first modified neural network to compute the classification; and responsive to determining that the first attribute was influential for the first modified neural network to compute the classification, generating a mapping associating the first attribute to the classification.

12. The method of claim 10, wherein identifying the first number of data points that are associated with the first attribute comprises applying a decision tree to each of the first subset of data points to determine whether each of the first subset of data points is associated with the first attribute, wherein the decision tree comprises a plurality of nodes, and wherein the plurality of nodes of the decision tree correspond to a plurality of textual descriptions of a plurality of attributes, including the first attribute.

13. The method of claim 12, wherein the method further comprises:

generating a set of confidence scores corresponding, respectively, to the plurality of attributes, based on the respective number of data points that are associated with respective nodes of the decision tree; and based on a subset of the confidence scores meeting a threshold value: associating a subset of attributes corresponding to the subset of confidence scores with the classification.

14. The method of claim 13, further comprising:

generating the decision tree at least by:

applying a second set of data points to the decision tree;

determining ratios in which the second set of data points is distributed among the plurality of nodes; and optimizing the decision tree by re-organizing the plurality of nodes based on the ratios in which the second set of data points is distributed among the plurality of nodes.

15. The method of claim 10, wherein identifying the first number of data points, in the first subset of data points, that are associated with the first attribute, comprises:

obtaining a decision tree comprising a plurality of nodes, wherein each node of the decision tree represents a respective attribute, among a plurality of attributes; and applying the decision tree to the first subset of data points to:

identify a first number of data points that are associated with a first node of the decision tree, the first node corresponding to the first attribute;

identify a second number of data points that are associated with a second node of the decision tree, the second node corresponding to a second attribute;

based on determining that the first number of data points is greater than the second number of data points:

mapping the first attribute to the classification; and refraining from mapping the second attribute to the classification.

16. The method of claim 10, further comprising:

determining that the first hidden layer identifies the first attribute as a contributing factor for the classification based at least on the first number of data points, of the data points in the first subset of data points, that are associated with the first attribute.

17. The method of claim 10, wherein the attributes of the target data point are used to compute the information for the initial hidden layer of the plurality of hidden layers at least by:

converting the attributes into numerical format to generate an input vector; and applying the input vector to an input layer of the neural network to compute the information for the initial hidden layer of the plurality of hidden layers, wherein the first attribute is not among the attributes of the target data point converted into numerical format to generate the input vector.

18. A system comprising:

one or more processors; and memory storing instructions that, when executed by the one or more processors, cause the system to perform operations comprising:

identifying a training data set comprising a plurality of data points, each data point of the plurality of data points being associated with (a) a label and (b) a corresponding set of attributes;

using the training data set to train a neural network to generate a classification for a target data point, wherein the trained neural network comprises an input layer, a plurality of hidden layers, and an output layer, wherein attributes of the target data point are used to compute information for an initial hidden layer of the plurality of hidden layers, wherein information for each of the hidden layers, prior to a final hidden layer, is used to compute information for a next hidden layer in the plurality of hidden layers, wherein information for the final hidden layer of the plurality of hidden layers is used to compute the output layer, and wherein the output layer corresponds to the classification of the target data point;

generating insight for a first hidden layer of the trained neural network at least by:

modifying the trained neural network to generate a first modified neural network at least by re-configuring the first hidden layer of the trained neural network from (a) being used to compute the next hidden layer to (b) being used to compute the output layer, for the first modified neural network, corresponding to the classification for the target data point;

applying the first modified neural network to a set of data points to compute a classification for a first subset of the set of data points, wherein the first modified neural network computes the classification from values determined for the output layer, the values determined for the output layer being based on values determined for the first hidden layer; and based on determining the first subset of the set of data points corresponds to the classification, identifying a first number of data points, in the first subset of data points, that are associated with a first attribute;

modifying the trained neural network to generate a second modified neural network at least by re-configuring a second hidden layer of the trained neural network from (a) being used to compute a second next hidden layer to (b) being used to compute the output layer for the second modified neural network corresponding to the classification for the target data point;

applying the second modified neural network to the set of data points to compute the classification for a second subset of the set of data points;

identifying a second number of data points, in the second subset of data points, that are associated with the first attribute;

comparing the first number of data points with the second number of data points; and based on determining the first number of data points is greater than the second number of data points:

mapping the first hidden layer to the first attribute to indicate that at least the first hidden layer is used to compute a value for the first attribute; and refraining from mapping the second hidden layer to the first attribute.

* * * * *